(12) United States Patent
Watmough

(10) Patent No.: US 12,509,259 B1
(45) Date of Patent: Dec. 30, 2025

(54) BUNDLING SYSTEM FOR BANDING ITEM(S)

(71) Applicant: Amazon Technologies, Inc., Seattle, WA (US)

(72) Inventor: Oliver Watmough, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 147 days.

(21) Appl. No.: 18/200,728

(22) Filed: May 23, 2023

(51) Int. Cl.
B65B 13/02 (2006.01)
B65B 13/18 (2006.01)
B65B 13/22 (2006.01)

(52) U.S. Cl.
CPC .......... B65B 13/022 (2013.01); B65B 13/183 (2013.01); B65B 13/22 (2013.01)

(58) Field of Classification Search
CPC ..... B65B 13/022; B65B 13/183; B65B 13/22; B65B 2210/04; B65B 59/001
See application file for complete search history.

(56) References Cited

U.S. PATENT DOCUMENTS

| | | | |
|---|---|---|---|
| 4,187,751 A * | 2/1980 | Barnacle | H05K 13/0473 83/458 |
| 4,316,694 A * | 2/1982 | Martin | B65G 59/10 294/158 |
| 4,522,013 A * | 6/1985 | Hamilton | B65B 11/54 53/220 |
| 5,205,104 A * | 4/1993 | Nakashima | B65B 11/54 53/64 |
| 5,243,901 A * | 9/1993 | Green | B65B 13/06 144/192 |
| 5,372,357 A * | 12/1994 | Blaimschein | B25B 11/007 269/21 |
| 5,457,868 A * | 10/1995 | Blaimschein | B25B 11/007 269/21 |
| 5,528,881 A * | 6/1996 | Cappi | B65B 11/54 53/464 |
| 5,546,784 A * | 8/1996 | Haas | B21J 13/02 72/413 |
| 5,595,042 A * | 1/1997 | Cappi | B65B 11/54 53/64 |

(Continued)

FOREIGN PATENT DOCUMENTS

CN 104625792 A * 5/2015 ............. B25B 11/00

*Primary Examiner* — Anna K Kinsaul
*Assistant Examiner* — Mobeen Ahmed
(74) *Attorney, Agent, or Firm* — Eversheds Sutherland (US) LLP

(57) ABSTRACT

A bundling system that is configured to band item(s) together. The bundling system may have a platform having a plurality of actuatable rods that are configured to move between a retracted state and an extended state. The retraction of the rods may create a pocket within the rods for receiving the item(s), and may keep the item(s) in place while the item(s) are banded together. For example, a banding mechanism may place one or more band(s) around the item(s) in order to secure the item(s) together. In some instances, the item(s) may be banded together at one or more banding locations and/or different orientations to secure the item(s) together. After being banded, the item(s), now as single unit, may be packaged or further processed.

20 Claims, 17 Drawing Sheets

(56) References Cited

U.S. PATENT DOCUMENTS

| | | | | |
|---|---|---|---|---|
| 5,628,539 | A * | 5/1997 | Muchalov | B65G 47/90 294/902 |
| 5,722,646 | A * | 3/1998 | Soderberg | B25B 11/005 269/329 |
| 5,855,106 | A * | 1/1999 | Koyama | B65B 41/12 53/64 |
| 6,250,619 | B1 * | 6/2001 | Cook | B25B 11/005 269/329 |
| 6,267,341 | B1 * | 7/2001 | Fleming | B23Q 17/20 248/181.2 |
| 6,360,932 | B1 * | 3/2002 | Liu | B65B 13/186 226/90 |
| 6,895,728 | B2 * | 5/2005 | Kondo | B65B 11/54 53/466 |
| 8,322,700 | B2 * | 12/2012 | Saberton | B25B 11/005 29/559 |
| 8,622,686 | B2 * | 1/2014 | Stringfield | B65G 59/005 414/794.3 |
| 9,776,329 | B2 * | 10/2017 | Kai | B25J 9/104 |
| 10,279,456 | B2 * | 5/2019 | Fromm | B41J 3/40731 |
| 10,343,802 | B1 * | 7/2019 | Wu | B65B 59/001 |
| 10,391,600 | B2 * | 8/2019 | Zak | B23Q 7/18 |
| 10,492,570 | B2 * | 12/2019 | Quigley | A43D 119/00 |
| 10,633,190 | B2 * | 4/2020 | Bidram | B65G 25/08 |
| 10,669,054 | B1 * | 6/2020 | Hoffman | B65B 59/003 |
| 11,022,953 | B2 * | 6/2021 | Cook | B23Q 5/40 |
| 11,383,337 | B2 * | 7/2022 | Murai | B23Q 3/08 |
| 2005/0061163 | A1 * | 3/2005 | Kobiella | B65B 13/06 100/26 |
| 2006/0272283 | A1 * | 12/2006 | Kawanishi | B65B 11/54 53/76 |
| 2007/0020065 | A1 * | 1/2007 | Kirby | B23Q 1/035 414/1 |
| 2013/0127105 | A1 * | 5/2013 | Saberton | B23Q 3/00 29/559 |
| 2016/0214752 | A1 * | 7/2016 | Ono | B29C 66/849 |
| 2016/0229574 | A1 * | 8/2016 | Tanaka | B65B 61/26 |
| 2017/0190453 | A1 * | 7/2017 | Heller | B65B 45/00 |
| 2017/0225903 | A1 * | 8/2017 | Bouchard | B65G 43/08 |
| 2018/0111239 | A1 * | 4/2018 | Zak | B23Q 7/18 |
| 2020/0391333 | A1 * | 12/2020 | Murai | B25J 9/1669 |
| 2021/0070483 | A1 * | 3/2021 | Parrucci | B65B 41/12 |
| 2022/0111983 | A1 * | 4/2022 | Ma | B65B 27/10 |
| 2023/0202695 | A1 * | 6/2023 | Schoen | B65B 41/04 53/441 |
| 2023/0227196 | A1 * | 7/2023 | Shindou | B65B 57/12 140/93.2 |
| 2023/0356867 | A1 * | 11/2023 | Schulz | B65B 13/06 |
| 2024/0034500 | A1 * | 2/2024 | Juwet | B65B 57/00 |
| 2024/0124176 | A1 * | 4/2024 | Patel | B65B 13/04 |
| 2024/0343432 | A1 * | 10/2024 | Felsecker | B65B 13/18 |

* cited by examiner

BUNDLING SYSTEM FOR BANDING ITEM(S)

BACKGROUND

Bundling allows item(s) to be conveniently sorted, stored, or otherwise processed. Conventional processes may require an operator to hold the item(s) in place while being bundled, such as when a band is placed around the item(s). However, when multiple item(s) are being bundled, or the item(s) are unstable (e.g., round), the operator may have a difficult time securing the item(s) and placing the bands. Additionally, placing the band(s) at improper locations may fail to adequately secure the item(s). Accordingly, during further processing, the item(s) may become unbundled, leading to decrease throughout, damage, injury, and so forth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Figure 1:
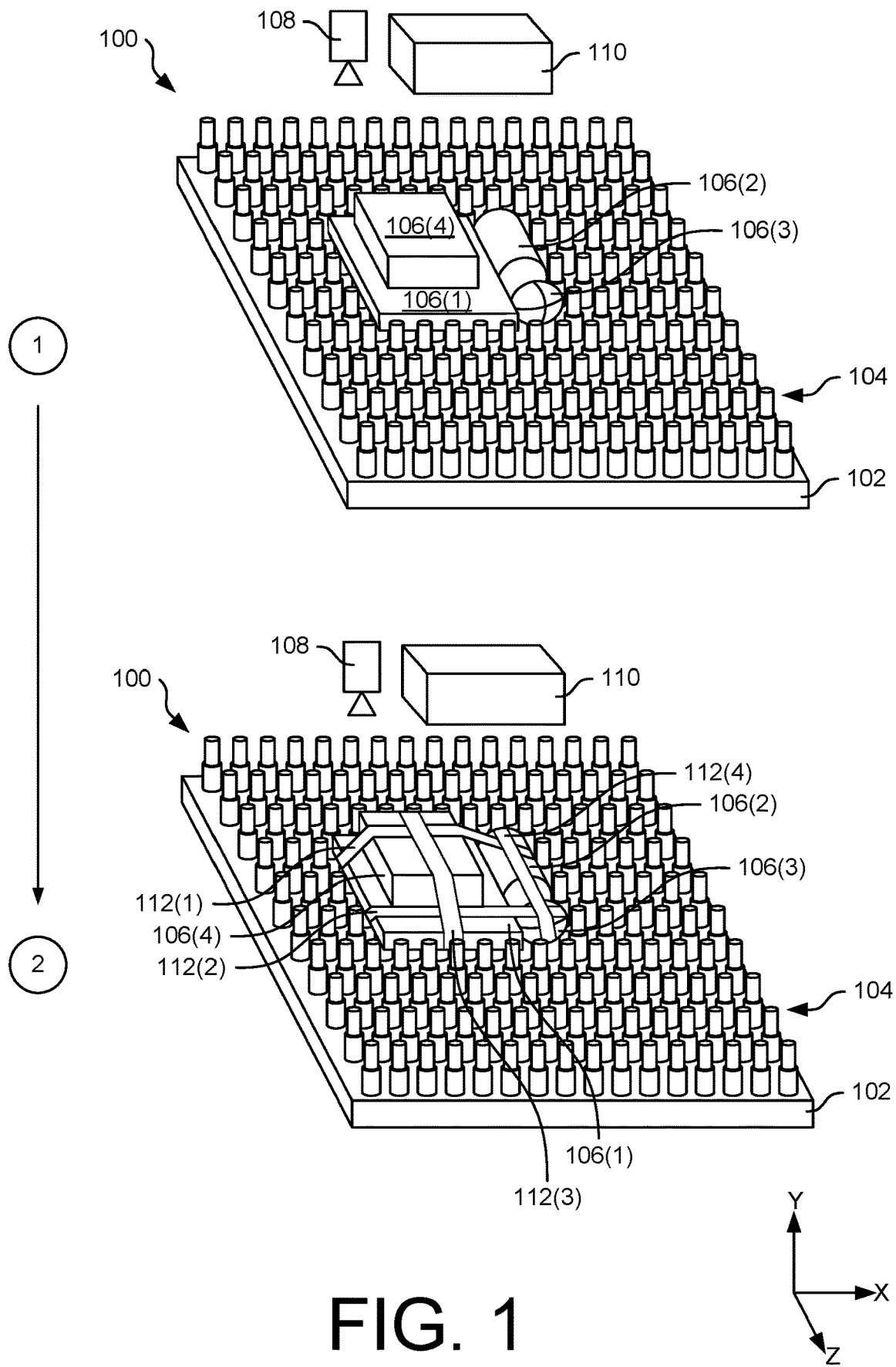
FIG. 1 illustrates an example bundling system, including a platform having a plurality of rods configured to receive one or more items, and a banding mechanism configured to band the one or more items together, according to examples of the present disclosure.

This application is directed, at least in part, to a bundling system that is configured to band item(s) together. In some instances, the bundling system may have a platform having a plurality of actuatable rods that are configured to move between a retracted state and an extended state. The retraction of the rods may create a pocket within the rods for receiving the item(s), and may keep the item(s) in place while the item(s) are banded together. For example, a banding mechanism may place one or more band(s) around the item(s) in order to secure the item(s) together. In some instances, the item(s) may be banded together at one or more banding locations and/or different orientations to secure the item(s) together. After being banded, the item(s), now as single unit, may be packaged or further processed. Accordingly, the use of the bundling system may serve to secure the item(s) in place while being banded together.

In some instances, the rods may be arranged in a grid-like fashion on the platform to provide a bed of rods that receives the item(s). For example, the rods may be arranged in columns and rows on the platform. The rods may be spaced apart from one another, across a width of the platform, along rows, and may be spaced apart from one another, across a length of the platform, between the columns. Any number of rods may be used, and the rods may be disposed across any number of columns and rows. In some instances, the number of rods may be based on any size or number of item(s) that the platform is configured to receive. In some instances, an end of the rod may include bearings, pads, tips, etc. to prevent damage to the item(s) and/or to permit the item(s) to be slid across the bed of rods. For example, placing ball rollers on an end of the rod(s) may allow the item(s) to be conveniently manipulated. Alternatively, rubber or cushioned tips may be placed on an end of the rod to as to not damage the item(s).

In some instances, the item(s) may be placed onto the rods via a human operator or via a robotic device (e.g., end effector, arm, etc.). As the item(s) are placed onto the rods, which extend from the platform, sensor(s) may sense the placement of the item(s). For example, camera(s) may detect the placement of the item(s) on the platform (e.g., coordinate positions), and in response, determine which rod(s) to retract. Additionally, or alternatively, pressure sensor(s) may detect a weight of the item(s) on certain rod(s), and in response, retract certain rod(s). Still, in some instances, biasing element(s), such as springs or actuators (e.g., pneumatic, hydraulic, etc.), may compress under the weight of the item(s) and thereby retract. The rods may be individually actuatable, whether passively or actively, via springs, pneumatically, hydraulically, and/or electronically. Furthermore, in some instances, the rods may include valve(s) (e.g., check valve) for maintaining a position of the rods when retracted and extended, respectively. However, regardless of the specific implementation, as the rod(s) retract, the item(s) may become secured between adjacent rod(s), for example, to prevent the item(s) rolling, translating, or otherwise reorienting before and while being banded. The sensor(s) may also detect a retraction and/or extension of the rod(s) for knowing a position of the rod(s), respectively.

The human operator or the robotic device may place any number of item(s) on the platform, and the rod(s) may hold any number of item(s) together. For example, a first item may be placed on the platform, such as on top of first rods, and in response, the first rods may retract. A second item may be placed on the platform, such as on top of second rods, and in response, the second rods may retract. The second item may be placed adjacent to the first item, and the second rod(s) may be adjacent to at least a portion of the first rods. Additionally, a third item may be placed on the platform, such as on top of third rods, and in response, the third rods may retract. This process may repeat for any number of item(s) to be bundled. Additionally, in some instances, item(s) may be stacked on top of one another. For example, a second item may be placed on top of a first item already placed on the platform. In some instances, the item(s) may be placed in any configuration that may optimize the overall dimensions and/or volume (e.g., for packaging). However, by retracting the rod(s) onto which the item(s) are received, the retracted rod(s) create for a pocket into which the item(s) are retained.

Once the item(s) are placed on the platform, the item(s) may be bundled together via the banding mechanism. In some instances, the banding mechanism may place banding material, such as bands, straps, cords, etc. around the item(s). The bands may be paper-based, plastic-based, composite-based, and/or any combination thereof. In some instances, the banding mechanism may include arms that extend between the rows and/or the columns, such as between rods disposed in different rows and/or columns, for banding the item(s) together. For example, the arms may translate into a space between the rods for banding the item(s) together. As such, the bands may be placed at banding locations that are in between the rods. In some instances, the bands may have coordinate positions on the platform. For example, the banding mechanism may move to certain coordinate positions (e.g., X, Y, and/or Z) for placing the bands around the item(s).

The banding mechanism may include a coil (e.g., roll) of the banding material for feeding around the item(s), as well as a tensioner for pulling or cinching the banding material around the item(s). Additionally, the banding mechanism may include a sealer that adheres ends (or portions, such as an overlapping region of banding material) of the banding material together. For example, once the banding material is cinched around the item(s), the sealer may cut the banding material and adhere the banding material together.

In some instances, the banding mechanism may be configured to place the bands at different banding locations around the item(s). For example, after placing a first band around the item(s) at a first banding location, the banding mechanism may move to a second banding location to place a second band around the item(s). The first band may be disposed at first coordinate positions (e.g., X, Y, and/or Z), and the banding mechanism may move to second coordinate positions (e.g., X, Y, and/or Z) for placing the second band. Additionally, the banding mechanism may move to different orientations to band the item(s) together in different directions. As an example, the banding mechanism may rotate to place a second band around the item(s) in a different direction as compared to the first band (e.g., orthogonal to the first band). In some instances, the banding mechanism may be configured to move, or the platform with the rods may move, for placing the bands at different orientations. The banding mechanism and/or the platform, may couple to a translation mechanism for translation along one or more axes (e.g., X, Y, and/or Z axis), and/or rotation about the one or more axes (e.g., X, Y, and/or Z axis).

In some instances, the locations at which the item(s) are banded may be based at least in part on dimensions, shapes, weights, etc. of the item(s). For example, the bands may be placed through central locations of the item(s) for securing the item(s) together. In some instances, the camera(s) of the bundling system, or other sensor(s) of the bundling system, may generate data that is used to determine the banding locations. Image/video data generated by the camera(s), for example, may be used to determine the item(s) on the platform. In some instances, the image/video data may be analyzed to detect objects on the platform, such as a shape of the item(s) and/or dimension(s) of the item(s), for determining the banding locations. For example, to band a spherical object and a rectangular object together, a banding location may be disposed through a center of the spherical object. In some instances, trained algorithms or machine-learned (ML) model(s) may be used to determine the placement of the bands. For example, the algorithms or trained ML model(s) may receive the image/video data generated by the camera(s), a shape of the detected object(s) (e.g., item(s)), a size of the item(s), a weight of the item(s), and so forth. The algorithms or trained ML model(s) may then output the banding locations, which are used by the banding mechanism and/or the translation mechanism, or more generally, the bundling system, for banding the item(s) together at the banding locations.

The banding locations may also be determined based at least in part on those rods that are retracted on the platform. For example, knowing which rod(s) on the platform are retracted may be used to determine a perimeter, size, and/or dimension(s) of the item(s) placed on the rod(s). As an example, the item(s) on the platform may have a size of 12"×24". Using this information, the banding location(s) may be determined at certain points to extend through the center of the item(s) (e.g., at 6" in a first direction, and at 12" in a second direction).

In some instances, prior to banding the item(s), sensor(s) of the bundling system may ensure that there are no disturbances, obstructions, safety concerns, etc. For example, sensor(s) may determine whether the human operator and/or the robotic device are free and clear of the platform and/or the rods. Suitable sensor(s) may include camera(s) and/or photoelectric sensor(s). Here, the sensor(s) may be used to restrict the banding mechanism banding the item(s) if an area, perimeter, etc. of the platform is breached.

After being banded, the item(s) may be removed from the platform. In some instances, the human agent may manually remove the item(s) from the platform, place the item(s) into a package for shipment, place the item(s) onto a conveyor for further processing, and so forth. Alternatively, the robotic device may remove the item(s). In some instances, knowing which rod(s) are retracted may be used to create a box, or package, for the item(s). For example, the size of the item(s) bundled together may be used in a downstream process to create a package for receiving the item(s). In some instances, those rod(s) that are retracted may be extended after banding for ease of removal. For example, once extended, the item(s) may be conveniently lifted off the platform, slide across a top of the rods, and so forth. After removal, the human operator and/or the robotic device may begin placing other item(s) onto the platform for further bundling.

In some instances, the rod(s) may be proactively retracted prior to the item(s) being placed on the platform. For example, the item may be scanned (e.g., via a barcode, code, identifier, etc.) for use in determining characteristics of the item, such as a shape, packaging material, dimension(s), weight, etc. Using this information, the bundling system may determine a location at which to place the item on the platform and/or how to band the item. The rod(s) at the location may be retracted, prior to the item being placed on the platform, so as to provide a pocket for receiving the item. The proactive retraction of the rods may provide a visual indication to the human operator as to where the item is to be placed. Therein, after placing the item on the platform, or on the at least partially retracted rods, another item may be scanned and subsequently, other rod(s) may retract for receiving the other item.

In some instances, rather than retracting the rod(s) individually based on the scanned item(s), the bundling system may retract certain rod(s) based on the item(s) to be placed on the platform. For example, an order may include three items, and the bundling system may use specifics of these three item(s) for retracting the rod(s) on the platform according to the placement of three item(s). In this sense, the rod(s) that receive the three item(s) may retract all at once, as compared in response to the item(s) being individually scanned. Therein, the item(s) may be organized onto the retracted rod(s).

In some instances, to assist the human operator as to the placement of the item(s), the bundling system may include lighting element(s) that illuminate an area on the platform corresponding to the placement of the item. For example, the lighting elements may output light within an area on the platform at which the item is to be placed. In some instances, different colors of lights may be used for the placement of the item(s). The lighting element(s) may also be used to output light within or at area(s) corresponding to the banding location(s), for example, to assist the human operator in placing the band(s) around the item(s).

The bundling system may include additional input/output (I/O) components for controlling operations performed by the bundling system. For example, the bundling system may include a touch-sensitive interface (e.g., display) used by the human operator for controlling the bundling system. Here, the human operator may provide inputs for controlling the banding locations, the banding process, the retraction and extension of the rods, and so forth.

The bundling system may be configured to bundle one or more first item(s) together, and thereafter, bundle one or more second item(s) to or with the one or more first item(s). Here, multiple banding processes may be performed to band item(s). For example, first item(s) may be banded together at a first instance in time, and thereafter second item(s) may be placed onto the platform (whether onto the first item(s), or adjacent to the second item(s)). The second item(s) may be banded to the first item(s) at a second instance in time that is after the first instance in time.

In some instances, the bundling system is configured to bundle any type of item(s), such as household goods, electronics, clothing, food, and so forth. The item(s) themselves may include packaging (e.g., boxes, sacks, bags, etc.) and/or may be unpackaged. The item(s) themselves may take any shape, such as being rectangular, cylindrical, spherical, hexagonal, and so forth. The bundling system may also communicatively couple to other devices located within an environment of the bundling system, and/or remote from the environment. In some instances, these other devices may at least partially control an operation of the bundling system, or components thereof.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example bundling system 100 used to bundle item(s) together, according to examples of the present disclosure. In some instances, the bundling system 100 may include a platform 102 having a plurality of rods 104. In some instances, the rods 104 may be coupled to the platform 102, or may be disposed at least partially through the platform 102. The rods 104 are shown being arranged across one or more rows and/or columns for receiving item(s) 106. For example, the rods 104 may define a bed that receive the items 106. As shown in FIG. 1, the rods 104 may receive four items 106, such as a first item 106(1), a second item 106(2), a third item 106(3), and a fourth item 106(4). However, although shown as including four items 106, more than or less than four items 106 may be included.

The rods 104 are configured to retract (e.g., in the Y-direction) for defining a pocket (e.g., bowl, receptacle, etc.) for retaining the items 106. For example, retracting the rods 104 creates the pocket to prevent the items 106 from rolling, shifting, reorienting, and so forth during the banding process. As shown, those rods 104 onto which the items 106 are placed are retracted. That is, the rod(s) 104 that do not receive the item(s) 106 may not retract, and may be extended such that the item(s) 106 within the pocket abut or are prevented from shifting. The rods 104 may be pneumatically, hydraulically, electronically, etc. controlled for retraction and extension. Various pumps, valves, motors, etc. may be used to control the rods 104, and the rods 104 may be individually controlled for causing the rods 104 to retract and extend, respectively.

The bundling system 100 may include a camera 108 for detecting the placement of the item(s) 106 on the platform 102, or on which rod(s) 104 the item(s) 106 are residing. For example, once the item(s) 106 are placed on the platform 102, or on certain rods 104, the camera 108 may generate image/video data that is used to detect the placement of the item(s) 106. Knowing the placement of the item(s) 106 may cause certain rod(s) to retract for retaining the item(s) 106. For example, once the first item 106(1) is placed on the platform 102, the camera 108 may detect which rod(s) 104 have received the first item 106(1) and in response, may cause those rod(s) 104 to retract. Therein, the second item 106(2), for example, may be placed adjacent to the first item 106(1) on the platform 102, and the camera 108 may detect the placement of the second item 106(2). In response, the rod(s) 104 underneath the second item 106(2) may retract, thereby retaining the second item 106(2). As shown, being as the item(s) 106 are bundled together, the second item 106(2) may be placed adjacent to the first item 106(1). The process may repeat for the third item 106(3) for causing additional rod(s) 104 to retract. Furthermore, the fourth item 106(4) is shown being placed on top of the first item 106(1). In some instances, a human operator or a robotic device (e.g., end effector, robotic arm, etc.) may place the item(s) 106 on the platform 102 in order to optimize an overall dimension or volume of the bundled items 106.

Once the item(s) 106 are placed on the platform 102, the item(s) 106 may be bundled together via a banding mechanism 110. For example, at "1" in FIG. 1, the item(s) 106 are shown unbundled, whereas at "2" in FIG. 1, the item(s) 106 are shown being bundled together via band(s) 112, such as a first band 112(1), a second band 112(2), a third band 112(3), and a fourth band 112(4). The band(s) 112 may span in different directions and/or orientations. The first band 112(1) and the second band 112(2) are shown oriented in a first direction (e.g., along the X-axis), while the third band 112(3) and the fourth band 112(4) are shown oriented in a second direction (e.g., along the Z-axis). Although four of the band(s) 112 are shown in FIG. 1, more than or less than four band(s) 112 may be used to bundle the item(s) 106.

In some instances, the location of the band(s) 112 (e.g., banding locations) may be based on the item(s) 106. For example, the banding location(s) may be according to positions that secure the item(s) 106 together. In some instances, image/video data generated by the camera 108 (or other sensor(s)) is used to determine the banding location(s). For example, based on the placement of the item(s) 106, the number of item(s) 106 being banded together, etc., the image/video data may be analyzed to determine dimension(s), a shape, etc. of the item(s) 106, respectively. Object detection or computer vision techniques may be used to analyze the image/video data to identify the shape, for example, and where to band the item(s) 106. This information may be used to determine the banding location(s). Analysis of the image/video data may also be used to determine the number of band(s) to bundle the item(s). Additionally, the platform 102 and/or the banding mechanism 110 may be movable via a translation mechanism (e.g., motors, rails, track system, etc.) to place the band(s) 112 around the item(s) 106 at the different location(s). The translation mechanism may move the platform 102 and/or the banding mechanism 110 along one or more axes, and/or about one or more axes.

To further illustrate, the first band 112(1) may secure the first item 106(1), the second item 106(2), and the fourth item 106(4) together. The second band 112(2) may secure the first item 106(1) to the third item 106(3) together. As shown, the third item 106(3) may represent a spherical object, and to secure the third item 106(3), the second band 112(2) may be placed around a center of the spherical object. The center of the spherical object may be determined via analysis of the image/video data for use in determining the banding location and where to place the second band 112(2). In other words, if the second band 112(2) was not placed through the center of the third item 106(3), the third item 106(3) may be at risk of slipping out of the second band 112(2), for example. As such, the camera 108 may be used to determine a center of the third item 106(3) for securing the third item 106(3) to the first item 106(1) via the second band 112(2). Additionally, noted above, the translation mechanism may be used to move platform 102 and/or the banding mechanism 110 to place the second band 112(2).

After placing the first band 112(1) and the second band 112(2), the banding mechanism 110 and/or the platform 102 may maneuver to dispose the third band 112(3) and the fourth band 112(4). For example, the third band 112(3) may be placed around a center of the first item 106(1) and the fourth item 106(4). The fourth band 112(4) may be disposed through a center of the second item 106(2) and the third item 106(3). The center of the second item 106(2) and the third item 106(3) may be determined via the image/video data of the camera 108 for use in controlling the banding mechanism 110 to place the fourth band 112(4). The translation mechanism may move (e.g., rotate) the platform 102 and/or the banding mechanism 110 for placing the third band 112(3) and the fourth band 112(4).

However, although discussed as placing four bands 112 around the items 106, more than or less than four bands 112 may be placed around the items 106. For example, instead of placing four bands 112 around the items 106, only two bands 112 may be placed around the items 106. Here, a first band may be placed around the second item 106(2) and the third item 106(3) (e.g., in the Z-direction), and a second band (e.g., in the X-direction) may be placed around the banded second item 106(2) and third item 106(3). The second band, for example, way wrap around the first item 106(1), the second item 106(2), and the fourth item 106(4). Being as the second item 106(2) and the third item 106(3) were previously banded together (via the first band), the second band may be used to secure the second item 106(2) and the third item 106(3) to the first item 106(1) and the fourth item 106(4). Accordingly, in this example, only two bands may be used to secure the items 106 together. In some instances, the number of bands 112 and/or the banding locations may be based at least in part on the number of item(s) 106 being banded.

Details of the banding mechanism 110 are discussed herein, however, in some instances, the banding mechanism 110 may include arm(s) that are configured to be disposed between the rod(s) 104 for wrapping the band(s) 112 around the item(s) 106. For example, the arm(s) may be disposed in a gap between adjacent rod(s) 104 for wrapping the band(s) 112 around the item(s) 106. The banding mechanism 110 may further include a tensioner for cinching (e.g., tightening) the band(s) 112 around the item(s) 106, and/or a sealer for coupling (e.g., adhering, melting, etc.) ends or portions of the band(s) 112 together. After being banded, the item(s) 106 may be removed from the platform 102. In some instances, the human operator may manually remove the item(s) 106 from the platform 102, place the item(s) 106 into a package for shipment, place the item(s) 106 onto a conveyor for further processing, and so forth. Alternatively, the robotic device may remove the item(s) 106. Additionally, although the banding mechanism 110 is described as banding the item(s) 106 together, the human operator may manually place the band(s) 112 around the item(s) 106. In such instances, the human operator may utilize one or more tool(s), handheld devices, machines, etc. for placing the band(s) 112.

While the discussion in FIG. 1 is with regard to retracting certain rod(s) 104 in response to item(s) 106 being placed thereon, as will be explained herein, the rod(s) 104 may be proactively retracted before the item(s) 106 are placed on the rod(s) 104. For example, the item(s) 106 being bundled may be scanned to determine one or more dimensions, shapes, etc. of the item(s) 106. In response, certain rod(s) 104 on the platform 102 may retract in order to form the pocket for the item(s) 106. In this sense, pocket may be proactively formed before the item(s) 106 are placed on the platform 102. Additionally, as will also be discussed herein, sensor(s) other than the camera 108 may be used to determine the placement of the item(s) 106 on the platform 102.

Although FIG. 1 illustrates a single bundle of item(s) 106 being bundled on the platform 102, in some instances, more than one bundle of item(s) may be included on the platform 102. For example, second item(s) may be bundled on the platform 102, at a location spaced apart from the item(s)

106(1)-(4). In turn, the banding mechanism 110 may bundle each of the item(s) separately. After banding the item(s) 106(1)-(4) together, the banding mechanism 110 may move to another location on the platform 102 for bundling other item(s) 106.

Even though the rod(s) 104 are described and shown, the platform 102 may include other structures, such as pillars, bars, struts, etc. in which the band(s) 112 are capable of being wound through and/or around. Additionally, any number of rod(s) 104 may be included, for example, to adjust a granularity the rod(s) 104 that retain the item(s) 106 and/or retract. For example, by using more of the rod(s) 104, smaller item(s) may be placed on the platform 102, and the band(s) 112 may be placed at more banding locations.

The bundling system 100 may be located in an environment in which the item(s) 106 are processed, categorized, and/or otherwise readied for shipment. For example, the environment may include an inventory field (not shown) in which item(s) 106 are located. In some instances, robotic elements may be used to pick the item(s) 106 from the inventory field and delivery the item(s) 106 to the bundling system 100.

Figure 2A:
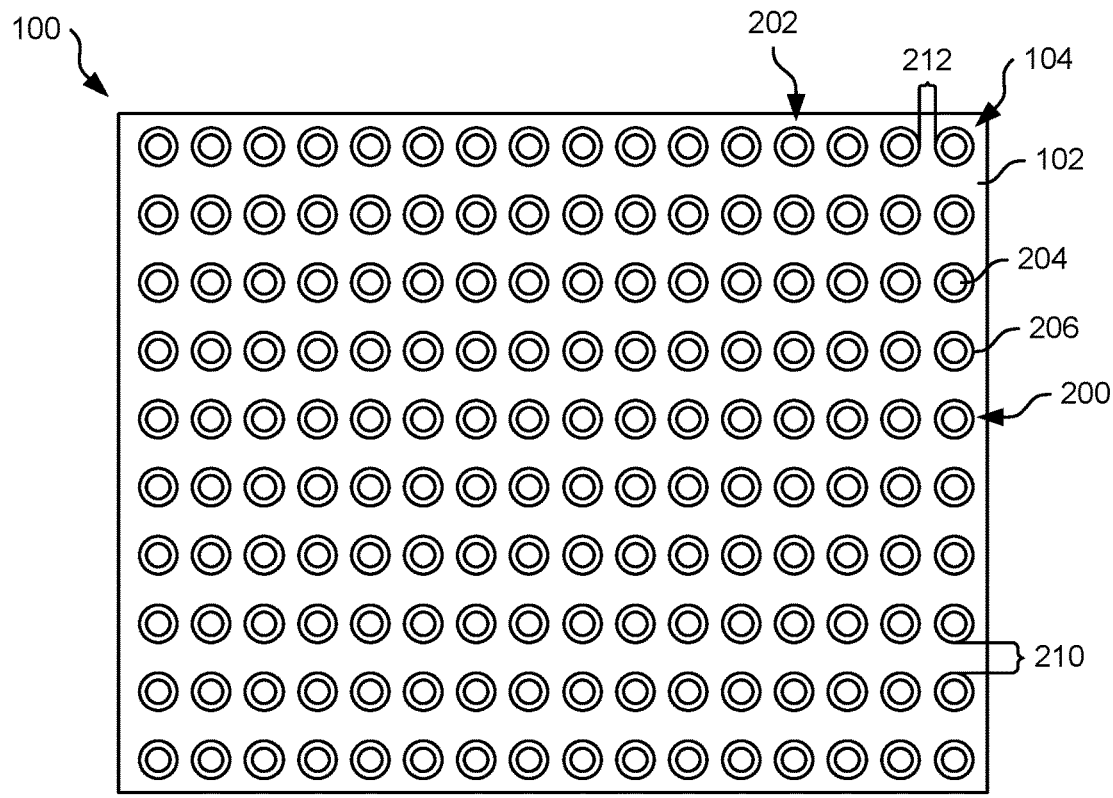
FIGS. 2A and 2B illustrate the platform of the bundling system of FIG. 1, according to examples of the present disclosure.
Figure 2B:
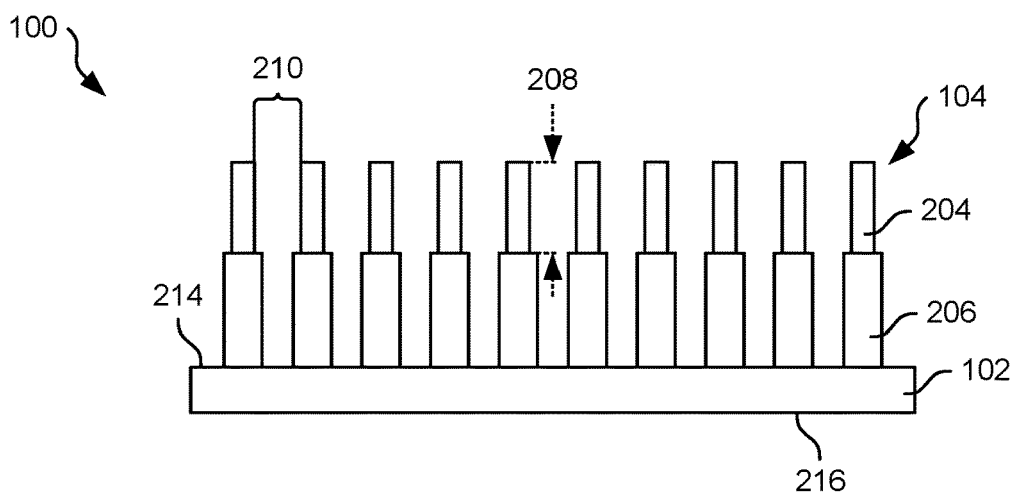

FIGS. 2A and 2B illustrate the platform 102 with the rods 104 of the bundling system 100, according to examples of the present disclosure. FIG. 2A may illustrate a top view of the platform 102 and the rods 104 and FIG. 2B may illustrate a side of the platform 102 and the rods 104. The rods 104 may be arranged about the platform 102 in rows 200 (e.g., in the Z-direction) and in columns (e.g., in the X-direction). The bundling system 100, or the platform 102, may include any number of rows 200 and columns 202, and any number of rods 104 arranged in the rows 200 and/or the columns 202. In some instances, the number of rods 104 disposed in the rows 200 may be the same or different as the number of rods 104 disposed in the columns 202. For example, the platform 102 may include ten of the rows 200, having sixteen rods 104, and may include sixteen of the columns 202, having ten rods 104. In some instances, the number of rods 104 may be based on a size, shape, weight, etc. of the item(s) 106 the platform 102 is configured to receive. For example, more rods 104 may be used to increase a granularity of the pocket formed around the item(s) 106.

The rods 104 may include a shaft portion 204 and a base portion 206. The base portion 206 may couple to the platform 102, and the shaft portion 204 may extend from the base portion 206 by various lengths. For example, the shaft portion 204 may have a range of travel 208 out of the base portion 206 (e.g., in the Y-direction). In FIG. 2B, the shaft portion 204 may be fully extended out of the base portion 206, at a full extent of the range of travel 208. However, the shaft portion 204 may be retracted into the base portion 206, to a lesser extent of the range of travel 208, when item(s) 106 are placed on the rod(s) 104. The shaft portion 204 of the rods 104 may be individually controlled for forming the pocket within the rods 104 for receiving the item(s) 106. As will be explained herein, the rods 104 may include or be coupled to components, such as valves, motors, actuators, etc. to permit retraction and extension.

A first gap distance 210 (e.g., in the Z-direction) may exist between adjacent rows 200 of the rods 104, and a second gap distance 212 (e.g., in the X-direction) may exist between adjacent columns 202 of the rods 104. In some instances, the first gap distance 210 and/or the second gap distance 212 may be disposed between adjacent shaft portions 204 of the rods 104, or between adjacent base portions 206 of the rods 104. In some instances, the first gap distance 210 may be the same or different than the second gap distance 212.

Although the platform 102 is shown being rectangular in shape, other shapes are envisioned. In some instances, the rods 104 are disposed on a top surface 214 of the platform 102. However, in some instances, the rods 104 (or a portion thereof) may be disposed through channels, openings, etc. of the platform 102. For example, only the shaft portion 204 of the rods 104 may be disposed through the platform 102, while the base portion 206 may reside adjacent to a bottom surface 216 of the platform 102. Still, although the platform 102 is shown as being a single body, the platform 102 may be made of different sections, segments, portions, etc. Furthermore, the rods 104 (e.g., the shaft portion 204 and/or the base portion 206) may have other shapes as shown, may be sized differently than shown, etc. The platform 102 may additionally couple to a translation mechanism that is configured to rotate and/or translate the platform 102, and therefore the item(s) 106 placed thereon, for banding the item(s) 106 at the different banding location(s).

Figure 3:
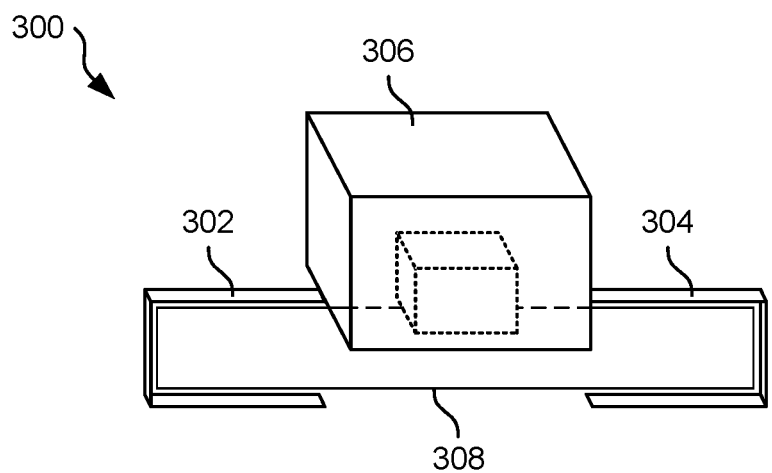
FIG. 3 illustrates an example banding mechanism of the bundling system of FIG. 1, according to examples of the present disclosure.

FIG. 3 illustrates an example banding mechanism 300 for banding the item(s) 106 together, according to examples of the present disclosure. The banding mechanism 300 may represent or be similar to the banding mechanism 110 used in conjunction with the bundling system 100.

The banding mechanism 300 may include a first arm 302 and a second arm 304 used to wrap banding material 308 around the item(s) 106. The first arm 302 and/or the second arm 304 may extend from a housing 306 by various amounts, using actuators, motors, etc. For example, depending upon the size of the item(s) 106, the first arm 302 and/or the second arm 304 may be moved to various positions (e.g., in the X-direction). In some instances, once the banding mechanism 300 is positioned on platform 102, the first arm 302 and the second arm 304 may be actuated inward to wrap around the item(s) 106 and permit the banding material 308 to be wrapped around the item(s) 106. Here, the first arm 302 and/or the second arm 304 may be used to feed or otherwise route the banding material 308 around the item(s) 106. The banding material 308 may route through channel(s), around pulley(s), and so forth within the first arm 302 and the second arm 304.

In some instances, the banding mechanism 300 may reside overhead of the platform 102, and may move into position for banding the item(s) 106 via a translation mechanism (e.g., series of tracks, rails, motors, slides, etc.). The banding mechanism 300 may also include a tensioner, coil, and/or sealer that resides within the housing 306. For example, the banding material 308 may unroll from the coil, the tensioner may tension (e.g., cinch) the banding material 308 around the item(s) 106, and the sealer may cut/seal ends of the banding material 308 together to form the band(s) 112. The banding mechanism 300 may further include a feeder that feeds the banding material 308 around the item(s) 106.

Although a certain number or shape of the first arm 302 and/or the second arm 304 is shown, other numbers and/or embodiments are envisioned. For example, the first arm 302 and/or the second arm 304 may include different segments, length, and/or portions than shown. Additionally, the first arm 302 and the second arm 304 may be sized and configured to reside between the rods 104, within the first gap distance 210 and the second gap distance 212 for wrapping the banding material 308 around the item(s) 106.

Figure 4:
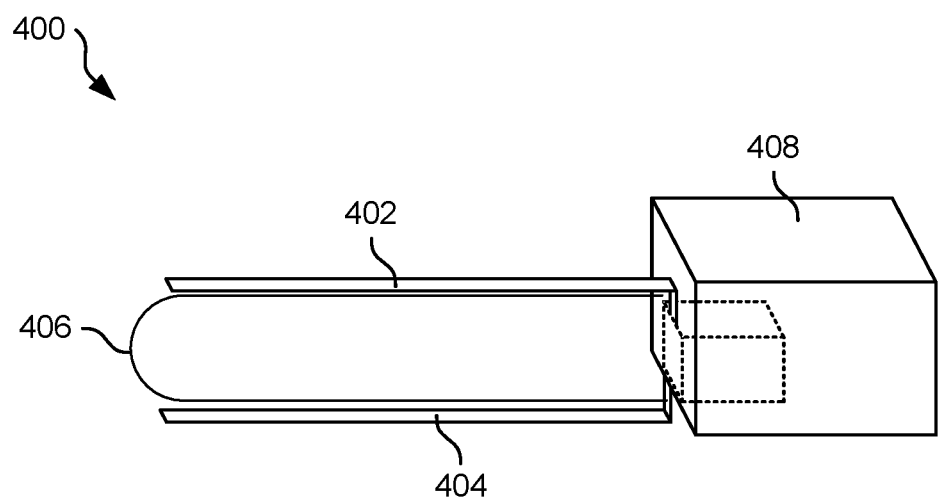
FIG. 4 illustrates an example banding mechanism of the bundling system of FIG. 1, according to examples of the present disclosure.

FIG. 4 illustrates an example banding mechanism 400 for banding the item(s) 106 together, according to examples of the present disclosure. The banding mechanism 400 may represent or be similar to the banding mechanism 110 used in conjunction with the bundling system 100.

The banding mechanism 400 may include a first arm 402 and a second arm 404 used to wrap banding material 406 around the item(s) 106. The first arm 402 and/or the second arm 404 may extend from a housing 408 by various amounts, using actuators, motors, etc. For example, depending upon the size of the item(s) 106, the first arm 402 and/or the second arm 404 may be moved to various positions (e.g., in the X-direction and/or the Y-direction). In some instances, once the banding mechanism 400 is positioned on platform 102 such that the first arm 402 resides above the item(s) 106, and the second arm 404 resides below the item(s) 106. For example, the first arm 402 and/or the second arm 404 may be slid into place around the item(s) 106. In doing so, the first arm 402 and/or the second arm 404 may be used to feed or otherwise route the banding material 406 around the item(s) 106. The banding material 406 may route through channel(s), around pulley(s), and so forth within the first arm 402 and the second arm 404.

In some instances, the banding mechanism 400 may reside overhead of the platform 102, or beside the platform 102, and may move into position for banding the item(s) 106 via a translation mechanism (e.g., series of tracks, rails, motors, slides, etc.). The banding mechanism 400 may also include a tensioner, coil, and/or sealer that resides within the housing 408. For example, the banding material 406 may unroll from the coil, the tensioner may tension (e.g., cinch) the banding material 406 around the item(s) 106, and the sealer may cut/seal ends of the banding material 406 together to form the band(s) 112. The banding mechanism 400 may further include a feeder that feeds the banding material 308 around the item(s) 106.

Although a certain number or shape of the first arm 402 and/or the second arm 404 is shown, other numbers and/or embodiments are envisioned. For example, the first arm 402 and/or the second arm 404 may include different segments, length, and/or portions than shown. Additionally, the first arm 402 and the second arm 404 may be sized and configured to reside between the rods 104, within the first gap distance 210 and the second gap distance 212 for wrapping the banding material 406 around the item(s) 106.

FIGS. 5A-5I illustrate a progression of banding the item(s) 106 together, according to examples of the present disclosure. FIGS. 5A-5I illustrate banding the item(s) 106 using the banding mechanism 110, such as the banding mechanism 300 or the banding mechanism 400, however, a similar process may be performed using other banding mechanisms.

Figure 5A:
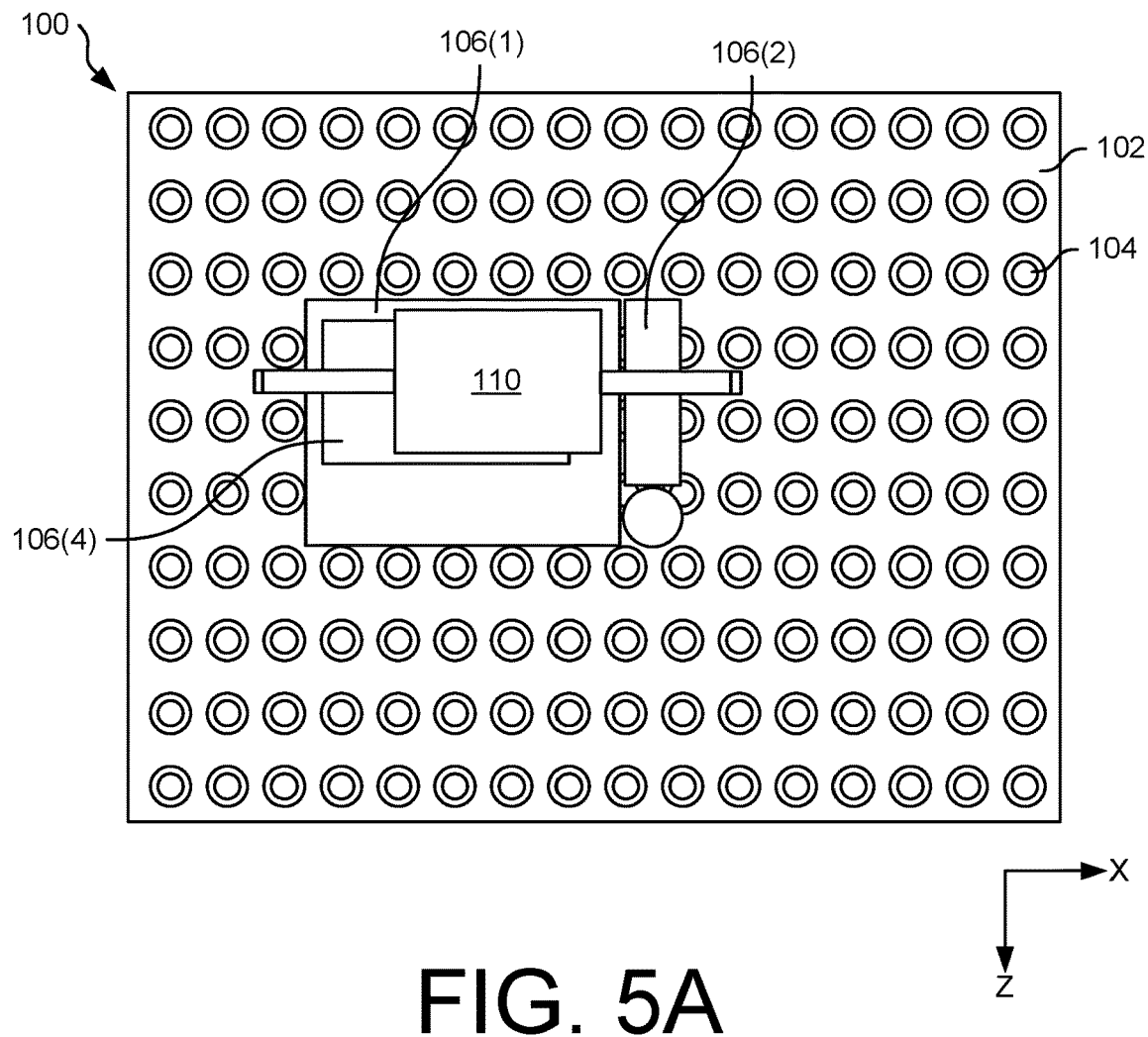
FIGS. 5A-5I illustrate a sequence for banding one or more items together using the bundling system of FIG. 1, according to examples of the present disclosure.
Figure 5B:
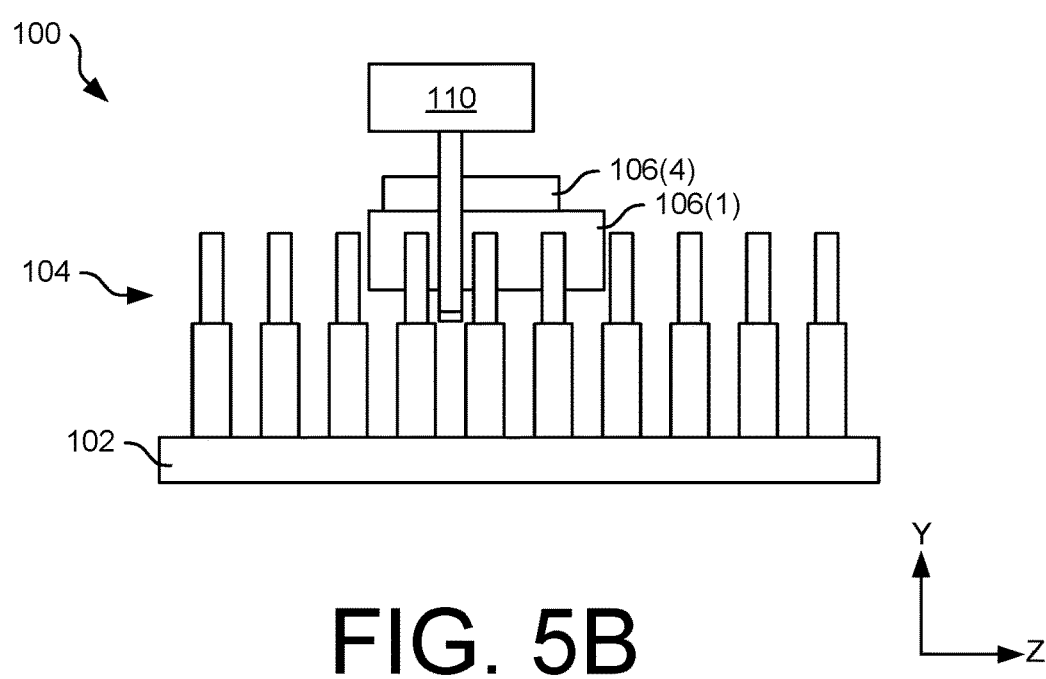

In FIGS. 5A and 5B, the first band 112(1) is shown being placed around at least a portion of the item(s) 106. To place the first band 112(1), the banding mechanism 110 may be moved into position above the item(s) 106 (e.g., via the translation mechanism). For example, based at least in part on the item(s) 106 being banded together via the first band 112(1), the banding mechanism 110 may be moved to a first banding location. The first banding location may have first coordinate positions (e.g., X, Y, and/or Z). At the first banding location, the first item 106(1), the second item 106(2), and the fourth item 106(4) may be banded together. In some instances, the first band 112(1) may be positioned centrally through one or more of the item(s) 106, such as the second item 106(2) and/or the fourth item 106(4). To determine the first banding location, image/video data may be analyzed. For example, upon analyzing the image/video data, a center of the second item 106(2) and/or the fourth item 106(4) may be determined for the first banding location. Therein, the banding mechanism 110 may move into position for placing the first band 112(1). As shown, the first banding location may be between rows of the rods 104, such as between the fourth row and the fifth row, such that the first band 112(1) may be wrapped around the first item 106(1), the second item 106(2), and the fourth item 106(4).

To place the first band 112(1), the banding mechanism 110 may first move into position vertically above the item(s) 106. Therein, the banding mechanism 110 descend upon the item(s) 106, which the arms spaced apart from one another. After descending, the arms may move closer together, around the item(s) 106 for wrapping the first band 112(1) or banding material corresponding thereto, around the first band 112(1).

Figure 5C:
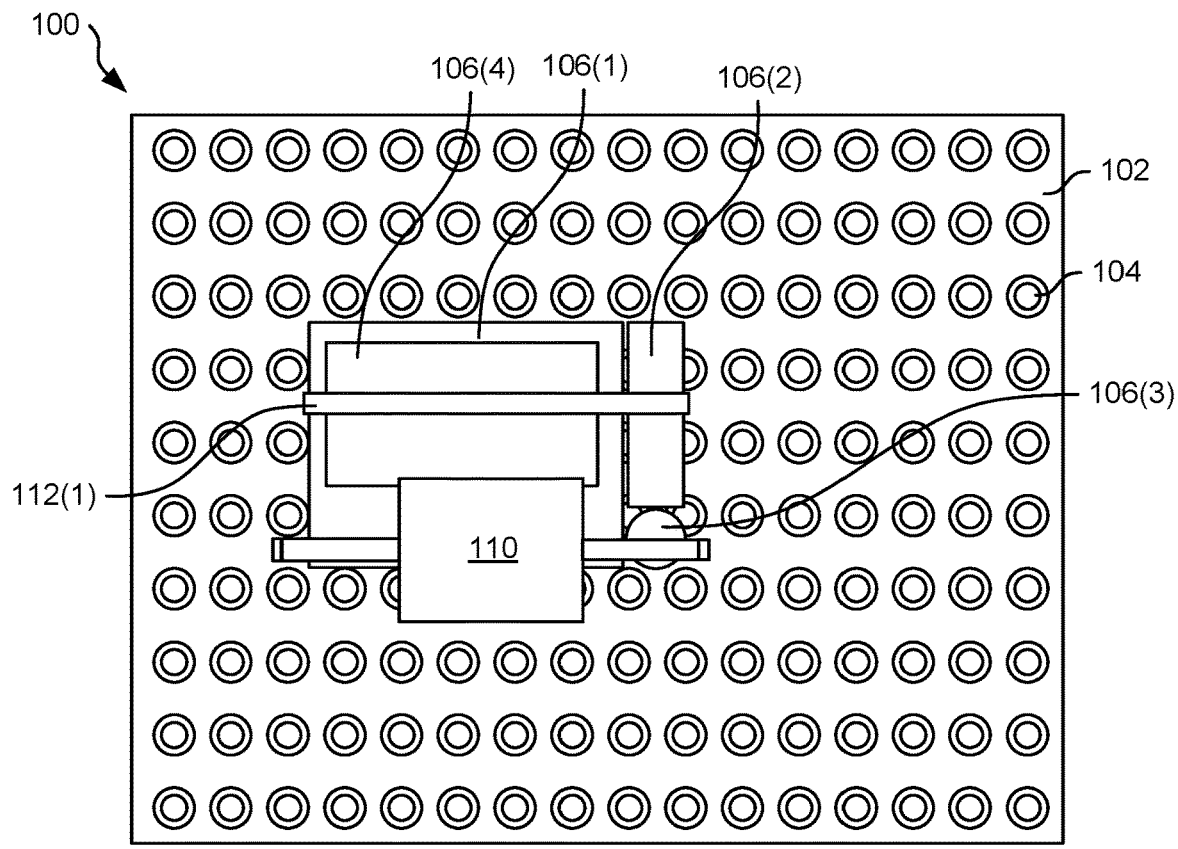
Figure 5D:
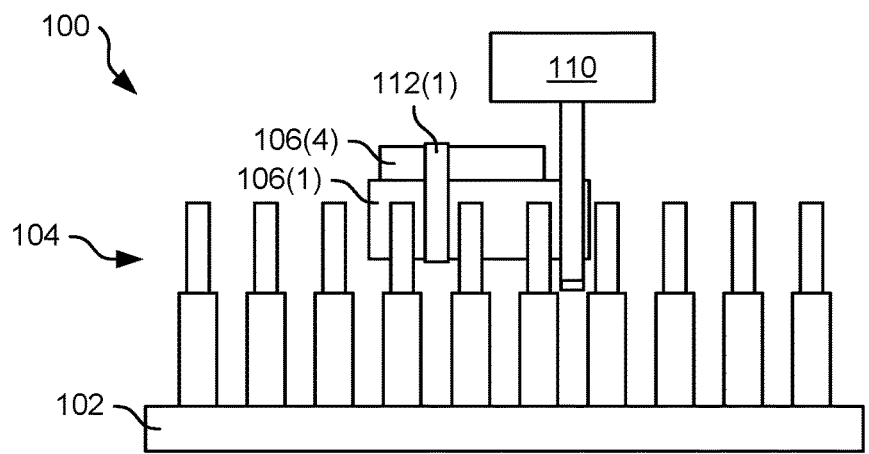

In FIGS. 5C and 5D, the second band 112(2) is shown being placed around at least a portion of the item(s) 106. Additionally, the first band 112(1) is shown around the first item 106(1), the second item 106(2), and the fourth item 106(4). After placing the first band 112(1), the banding mechanism 110 may move to a second banding location for placing the second band 112(2). For example, the translation mechanism may move the banding mechanism 110, from the first banding location to the second banding location (e.g., in the Z-direction). The second banding location may have second coordinate positions (e.g., X, Y, and/or Z), and the banding mechanism 110 may move from the first coordinate positions to the second coordinate positions. At the second banding location, the first item 106(1) and the third item 106(3) may be banded together. In some instances, the second band 112(2) may be positioned centrally through one or more of the item(s) 106, such as the third item 106(3). To determine the second banding location, image/video data may be analyzed. For example, upon analyzing the image/video data, a center of the third item 106(3) may be determined for the second banding location. Therein, the banding mechanism 110 may move into position for placing the second band 112(2). As shown, the second banding location may be between rows of the rods 104, such as between the sixth row and the seventh row, such that the second band 112(2) may be wrapped around the first item 106(1) and the third item 106(3).

To place the second band 112(2), the banding mechanism 110 may first move into position vertically above the item(s) 106. Therein, the banding mechanism 110 descend upon the item(s) 106, which the arms spaced apart from one another. After descending, the arms may move closer together, around the item(s) 106 for wrapping the second band 112(2) or banding material corresponding thereto, around the second band 112(2).

Figure 5E:
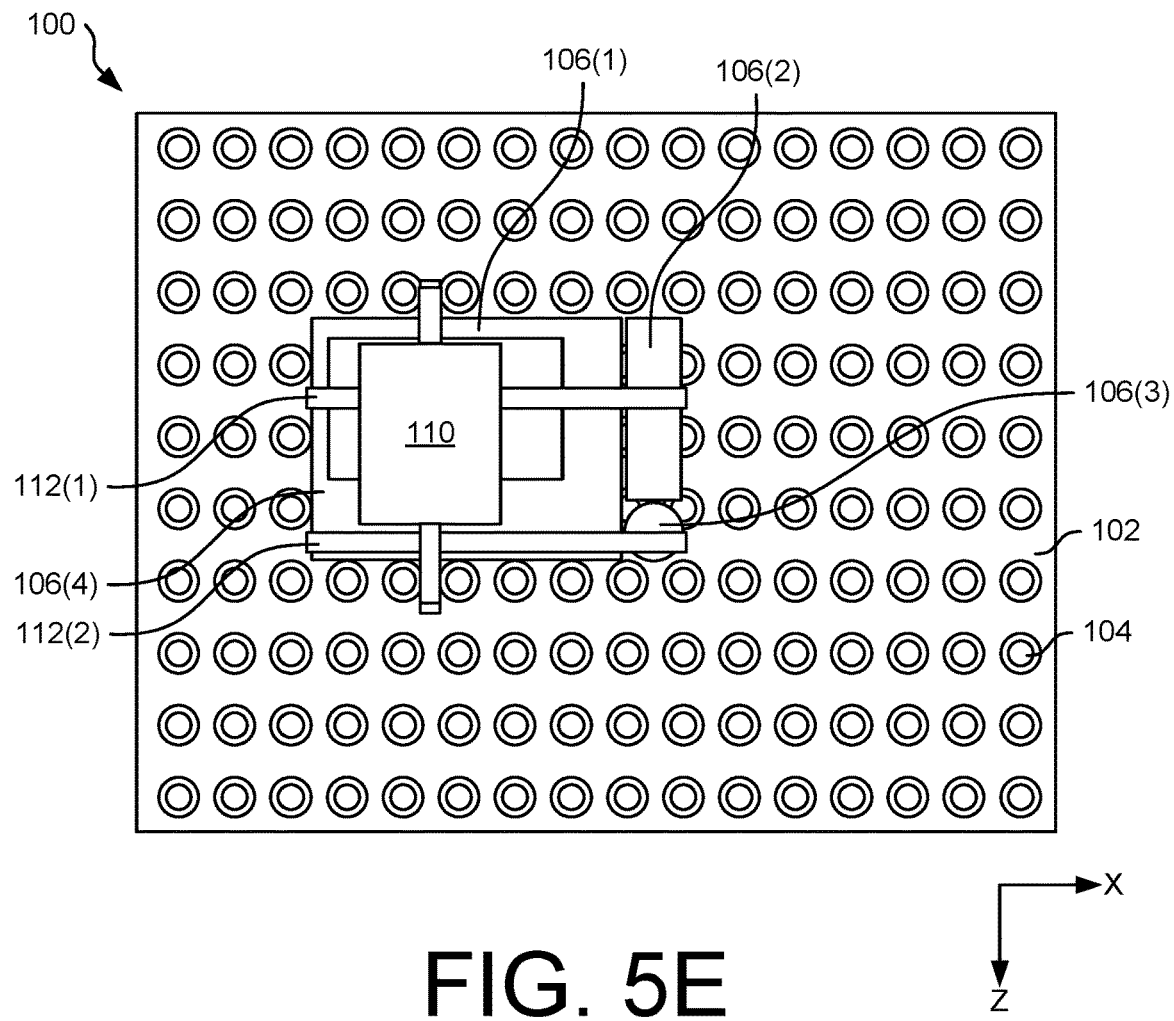
Figure 5F:
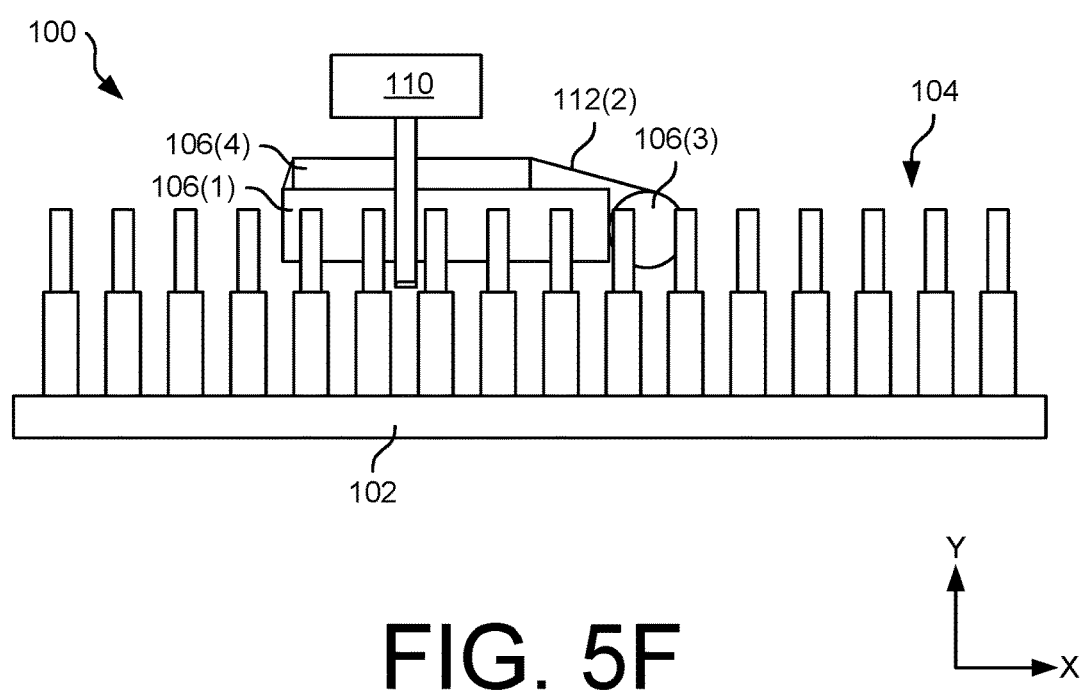

In FIGS. 5E and 5F, the third band 112(3) is shown being placed around at least a portion of the item(s) 106. Additionally, the first band 112(1) is shown around the first item 106(1), the second item 106(2), and the fourth item 106(4), and the second band 112(2) is shown around the first item 106(1) and the third item 106(3). After placing the second band 112(2), the banding mechanism 110 may move to a third banding location for placing the third band 112(3). For example, the translation mechanism may rotate the banding mechanism 110, from the second banding location to the third banding location (e.g., about the Y-axis). Alternatively, the platform 102 may rotate (e.g., about the Y-axis) for placing the third band 112(3) at the third banding location. For example, the third banding location may have third coordinate positions (e.g., X, Y, and/or Z), and the banding mechanism 110 may move from the second coordinate positions to the third coordinate positions.

At the third banding location, the first item 106(1) and the fourth item 106(4) may be banded together. In some instances, the third band 112(3) may be positioned centrally through one or more of the item(s) 106, such as the fourth item 106(4). To determine the third banding location, image/video data may be analyzed. For example, upon analyzing the image/video data, a center of the fourth item 106(4) may be determined for the third banding location. Therein, the banding mechanism 110 may move into position for placing the third band 112(3). As shown, the third banding location may be between columns of the rods 104, such as between the fifth column and the sixth column, such that the third band 112(3) may be wrapped around the first item 106(1) and the fourth item 106(4).

To place the third band 112(3), the banding mechanism 110 may first move into position vertically above the item(s) 106. Therein, the banding mechanism 110 descend upon the item(s) 106, which the arms spaced apart from one another. After descending, the arms may move closer together, around the item(s) 106 for wrapping the third band 112(3) or banding material corresponding thereto, around the third band 112(3).

Figure 5G:
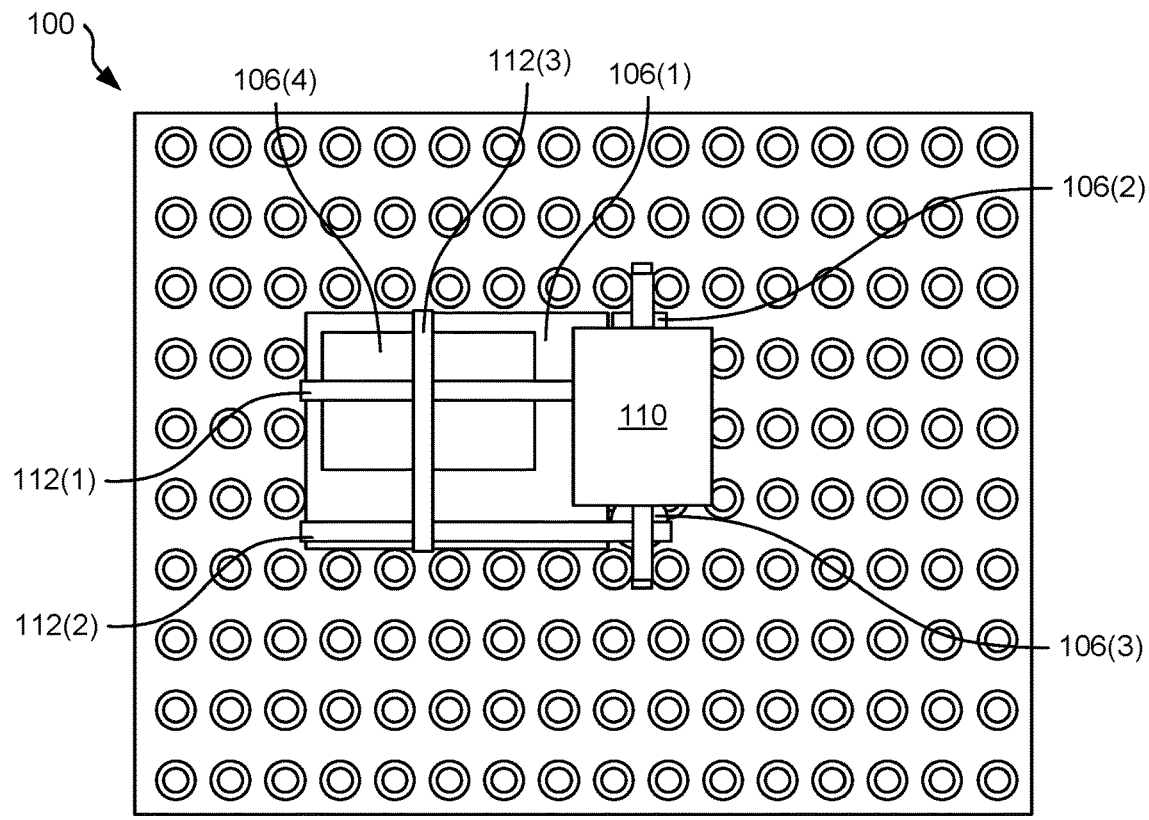
Figure 5H:
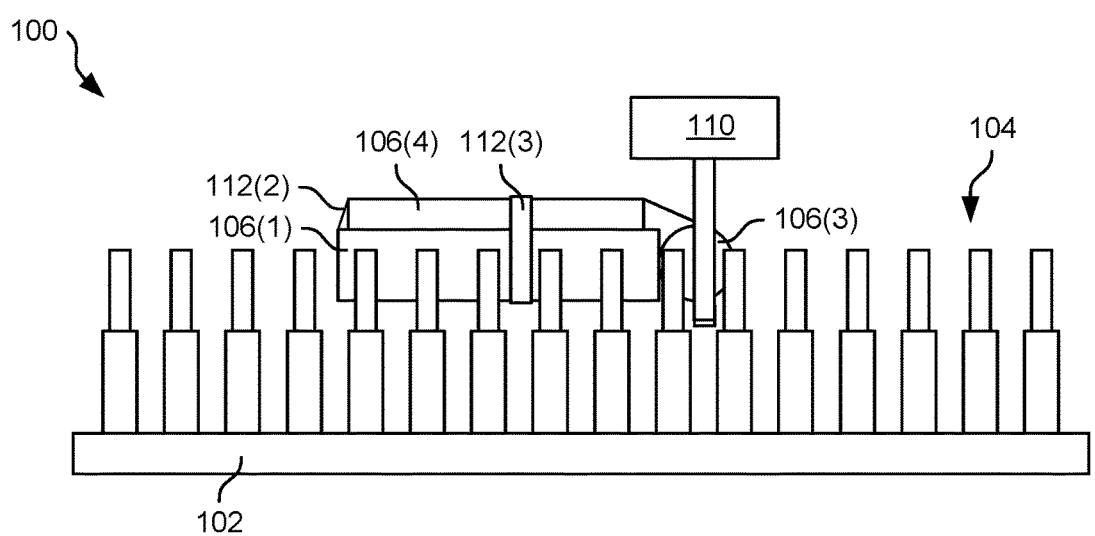

In FIGS. 5G and 5H, the fourth band 112(4) is shown being placed around at least a portion of the item(s) 106. Additionally, the first band 112(1) is shown around the first item 106(1), the second item 106(2), and the fourth item 106(4), the second band 112(2) is shown around the first item 106(1) and the third item 106(3), and the third band 112(3) is shown around the first item 106(1) and the fourth item 106(4). After placing the third band 112(3), the banding mechanism 110 may move to a fourth banding location for placing the fourth band 112(4). For example, the translation mechanism may move the banding mechanism 110, from the third banding location to the fourth banding location (e.g., in the X-direction). The fourth banding location may have fourth coordinate positions (e.g., X, Y, and/or Z), and the banding mechanism 110 may move from the third coordinate positions to the fourth coordinate positions.

At the fourth banding location, the second item 106(2) and the third item 106(3) may be banded together. In some instances, the fourth band 112(4) may be positioned centrally through one or more of the item(s) 106, such as the second item 106(2) and the third item 106(3). To determine the fourth banding location, image/video data may be analyzed. For example, upon analyzing the image/video data, a center of the second item 106(2) and the third item 106(3) may be determined for the fourth banding location. Therein, the banding mechanism 110 may move into position for placing the fourth band 112(4). As shown, the fourth banding location may be between columns of the rods 104, such as between the ninth column and the tenth column, such that the fourth band 112(4) may be wrapped around the second item 106(2) and the third item 106(3).

To place the fourth band 112(4), the banding mechanism 110 may first move into position vertically above the item(s) 106. Therein, the banding mechanism 110 descend upon the item(s) 106, which the arms spaced apart from one another. After descending, the arms may move closer together, around the item(s) 106 for wrapping the fourth band 112(4) or banding material corresponding thereto, around the fourth band 112(4).

Figure 5I:
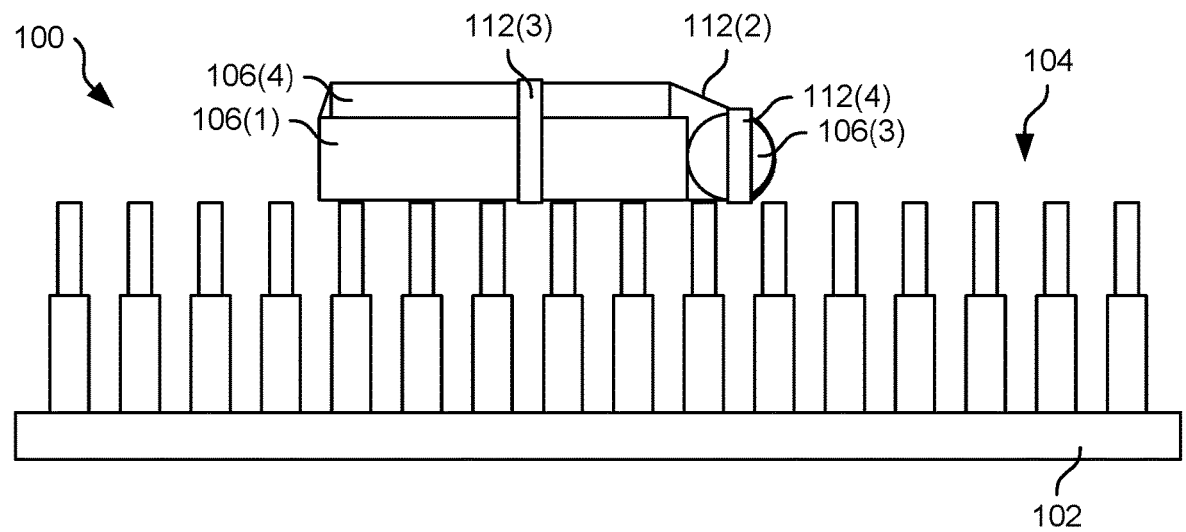
Figure 5I:
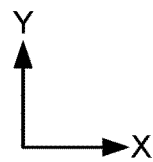

In FIG. 5I, the item(s) 106 are shown being disposed above the rod(s) 104. For example, once the item(s) 106 are banded together via the band(s) 112, the rod(s) 104 on which the item(s) 106 are disposed may extend to push the item(s) 106 upwards and out of the pocket (e.g., in the Y-direction). This action disposes the item(s) 106 out of rod(s) 104, or the pocket formed by the rod(s) 104, for ease of removal, for example.

Although in FIGS. 5A-5I, the banding mechanism 110 is shown and described as banding the item(s) 106 together, in some instances, the human operator may place one or more of the band(s) 112 around the item(s) 106. In some instances, the first band 112(1) and the second band 112(2) may be parallel to one another, and/or the third band 112(3) and the fourth band 112(4) may be parallel to one another. As shown, the first band 112(1) and the second band 112(2) may be oriented in a first direction (e.g., X-axis), while the third band 112(3) and the fourth band 112(4) may be oriented in a second direction (e.g., Z-axis). In some instances, the first direction may be orthogonal to the second direction. However, the band(s) 112 may be oriented at other angles compared to one another. Still, although four band(s) 112 are shown being wrapped around the item(s) 106, more than or less than four of the band(s) 112 may be used. In some instances, the number of the band(s) 112 and/or the placement of the band(s) 112 may be based at least in part on a number of the item(s) 106 being banded together, a shape of the item(s) 106, a weight of the item(s) 106, etc. For example, in some instances, instead of placing four bands 112 around the items 106, only two bands 112 may be placed around the items 106. A first band may be placed around the second item 106(2) and the third item 106(3) (e.g., in the Z-direction), and a second band (e.g., in the X-direction) may be placed around the banded second item 106(2) and third item 106(3). The second band, for example, way wrap around the first item 106(1), the second item 106(2), and the fourth item 106(4). Being as the second item 106(2) and the third item 106(3) were previously banded together (via the first band), the second band may be used to secure the second item 106(2) and the third item 106(3) to the first item 106(1) and the fourth item 106(4). Accordingly, in this example, only two bands may be used to secure the items 106 together.

Figure 6A:
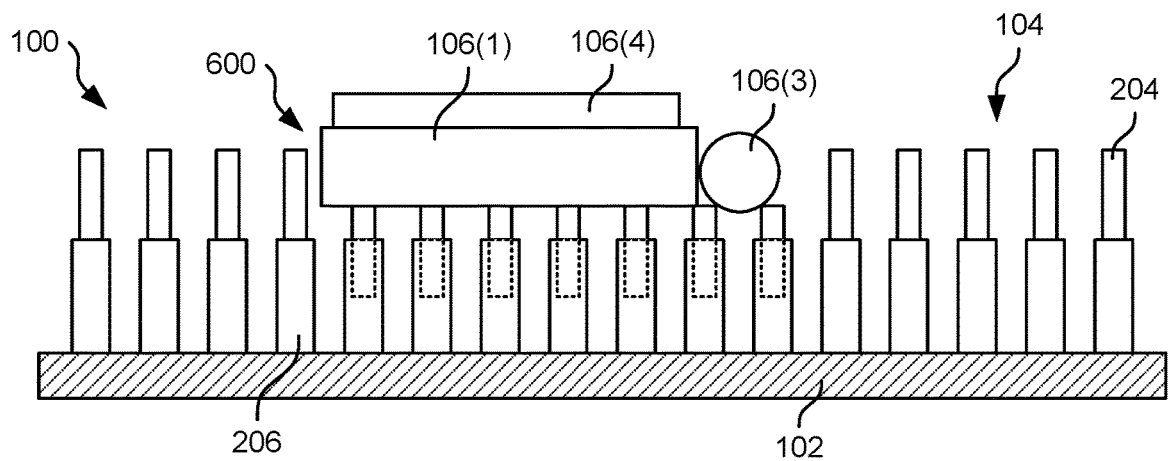
FIGS. 6A and 6B illustrate an example engagement between rods of the platform of the bundling system of FIG. 1, and the one or more items placed on the platform, according to examples of the present disclosure.
Figure 6B:
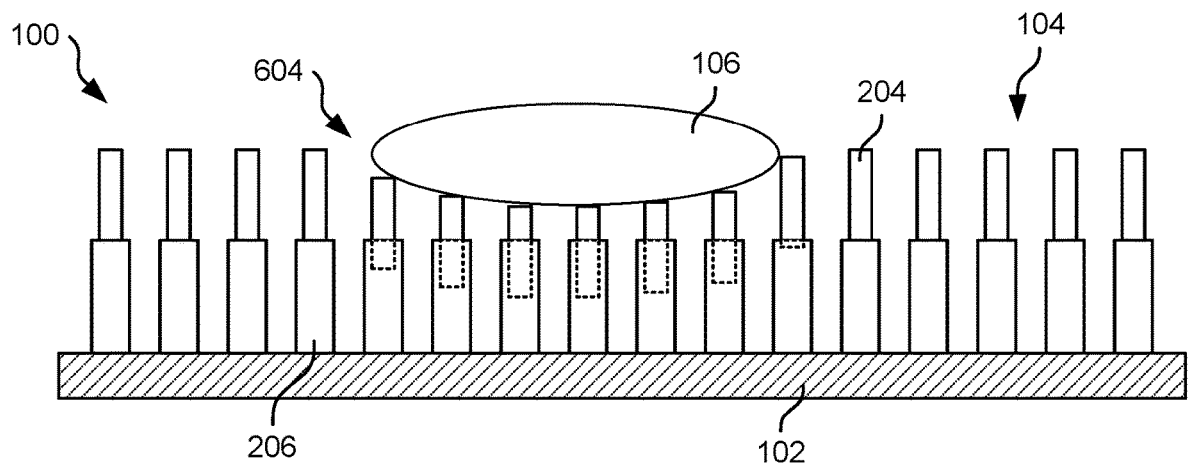

FIGS. 6A and 6B illustrate the rods 104 creating a pocket for the item(s) 106, according to examples of the present disclosure. In FIG. 6A, the rods 104 are shown being retracted by the same amount, whereas in FIG. 6B, the rods 104 are shown being retracted by different amounts.

In FIG. 6A, a first pocket 600 is formed via the rod(s) 104. For example, a portion of the rod(s) 104 corresponding to the placement of the item(s) 106 may be at least partially retracted. More particularly, the shaft portion 204 of the rod 104 may retract into the base portion 206 of the rod 104. As indicated above, those rod(s) 104 that are retracted (e.g., in the Y-direction), so as to form the first pocket 600, may be based at least in part on a placement of the item(s) 106 on the platform 102. For example, the camera 108 (or other sensor(s)) may determine the position of the item(s) 106 on the platform 102, or the rod(s) 104 that the item(s) 106 are placed on, and therein, retract the corresponding rod(s) 104. The rod(s) 104 in FIG. 6A may retract by a distance, which is within the range of travel 208 of the rods 104. The rod(s) 104 may retract further than shown in FIG. 6A, or may not retract further than shown in FIG. 6A.

In FIG. 6B, a second pocket 604 is formed via the rod(s) 104. For example, a portion of the rod(s) 104 corresponding to the placement of an item 106 may be at least partially retracted. More particularly, the shaft portion 204 of the rod 104 may retract into the base portion 206 of the rod 104. As indicated above, those rod(s) 104 that are retracted (e.g., in the Y-direction), so as to form the second pocket 604, may be based at least in part on a placement of the item 106 on the platform 102. For example, the camera 108 (or other sensor(s)) may determine the position of the item 106 on the platform 102, or the rod(s) 104 that the item(s) 106 are placed on, and therein, retract the corresponding rod(s) 104. Compared to the rod(s) 104 in FIG. 6A, the rod(s) 104 in FIG. 6B may retract by different distances. The retraction of the rod(s) 104 by different distances may form a bowl-like structure to prevent the item 106 reorientating during banding. For example, the shaft portion 204 of the rods 104 may extend from the base portion 206 by different amounts for forming the second pocket 604. The distances that the rods are retracted are within the range of travel 208.

In some instances, an end of the rod 104 may include bearings, pads, tips, etc. to prevent damage to the items 106 and/or to permit the item(s) 106 to be slid across the bed of rods 104. For example, placing ball rollers on an end of the rod(s) 106 may allow the item(s) 106 to be conveniently slid across the bed of rods 104. Alternatively, rubber or cushioned tips may be placed on an end of the rod 104 to as to not damage the items 106.

Figure 7:
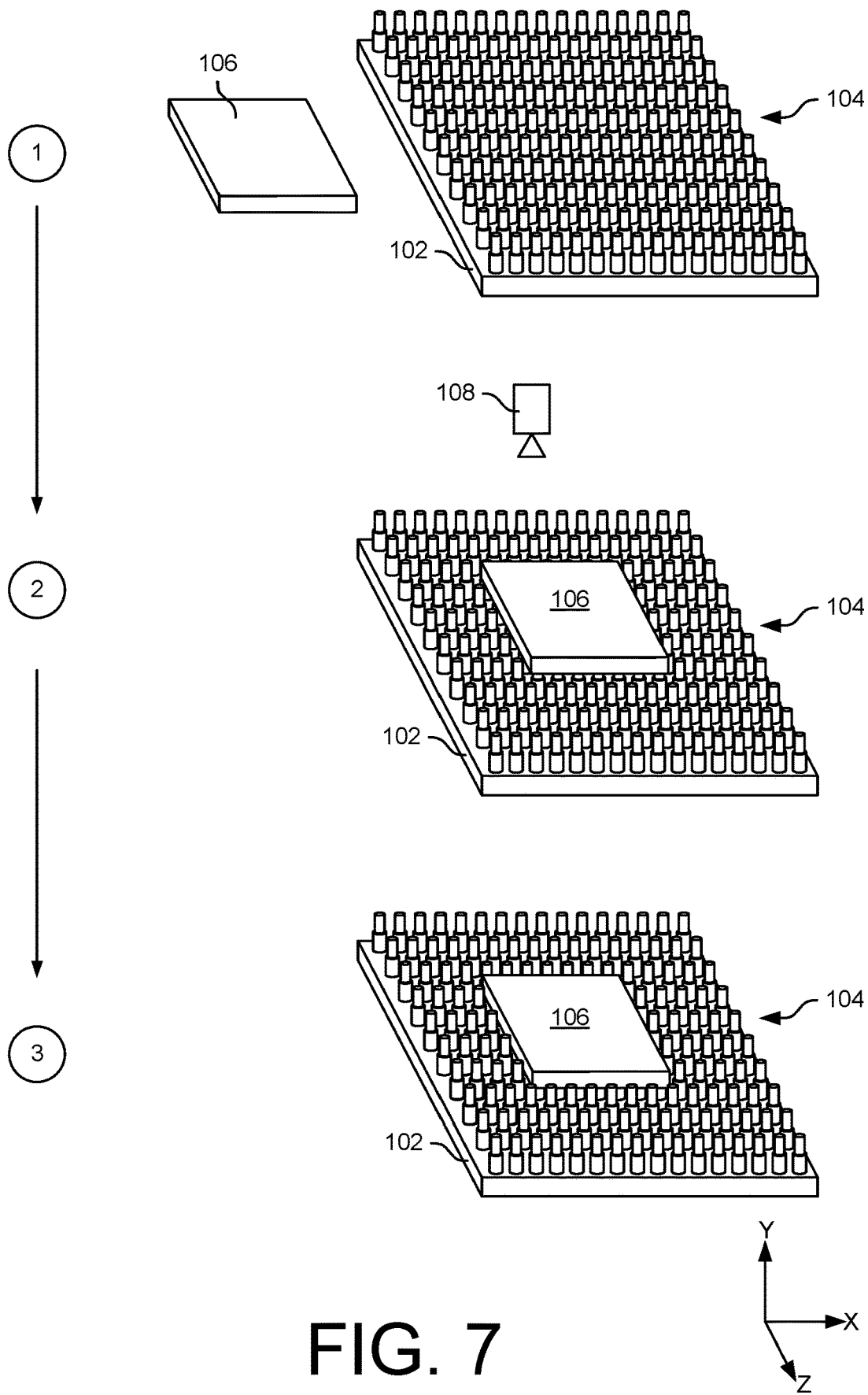
FIG. 7 illustrates an example retraction of the rods of the bunding system of FIG. 1, based on sensed positions of the item(s), according to examples of the present disclosure.

FIG. 7 illustrates a retraction of the rods 104 based on sensed positions of the item(s) 106, according to examples of the present disclosure. For example, at "1" in FIG. 7, the rod(s) 104 are shown fully extended, and no item(s) 106 reside on the rod(s) 104. However, an item 106 may be readied to be placed on the rod(s) 104. For example, at "2" in FIG. 7, the item 106 may be placed on a subset of the rod(s) 104. At this point, the rod(s) 104 may not be retracted (e.g., in the Y-direction). In some instances, under the weight of the item 106, the rod(s) 104 may retract and a check valve may maintain a position of the rod(s) 104 in the retracted state. Additionally, or alternatively, the camera 108 (or an additional sensor) may be used to determine a position of the item 106 on the rod(s) 104. For example, the camera 108 may determine coordinate positions of the item 106 on the platform 102, and/or which rod(s) 104 that the item 106 resides on. In the former, the bundling system 100 may utilize the coordinate positions of the item 106 on the platform 102 for knowing which rod(s) 104 to retract.

At "3" in FIG. 7, those rod(s) 104 on which the item 106 resides may be retracted. For example, following "2" in FIG. 7 in which the item 106 is detected, and the coordinate positions of the item 106 are detected, those rod(s) 104 at or within the coordinate positions of the item 106 may be retracted, thereby creating the pocket for the item 106.

Figure 8A:
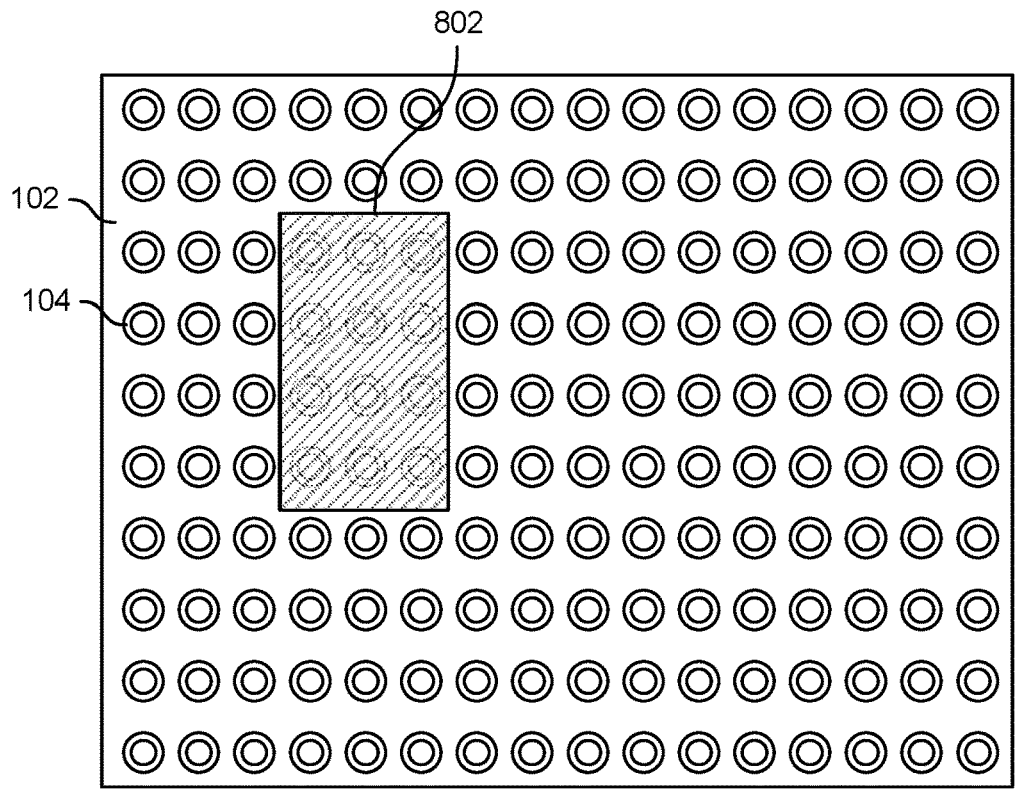
FIGS. 8A-8C illustrate example lighting elements used to illuminate a portion of the platform of the bundling system of FIG. 1, and/or causing certain rods to retract, for guiding a placement of the one or more items on the platform, according to examples of the present disclosure.
Figure 8B:
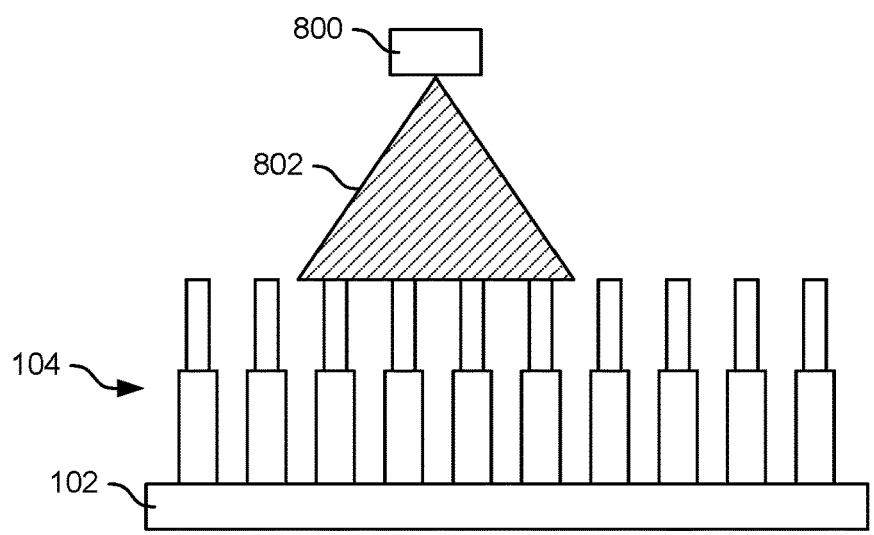
Figure 8C:
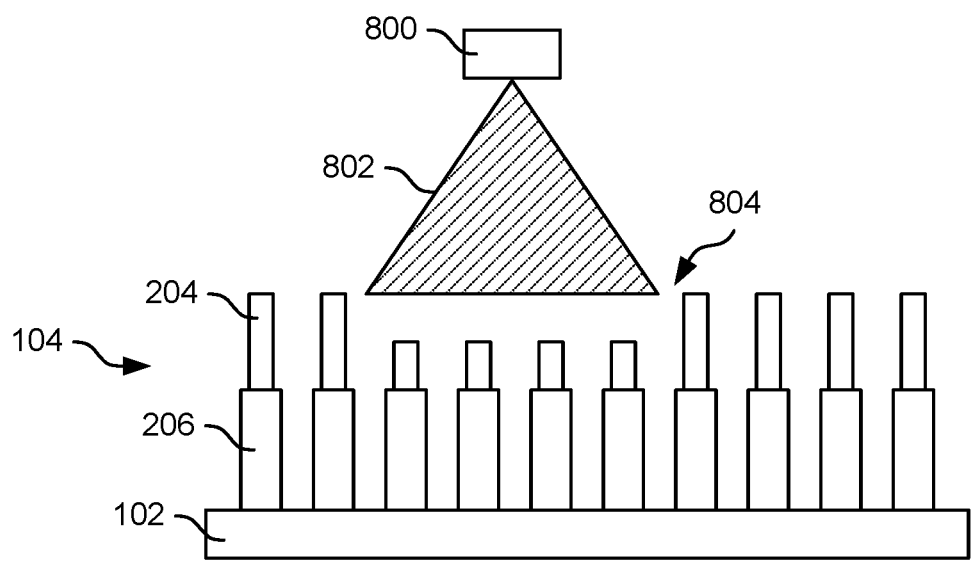
Figure 8C:
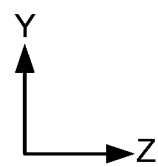

FIGS. 8A-8C illustrate illuminating a portion of the platform 102, or certain rods, corresponding to the placement of the item(s), and/or causing certain rods 104 to retract for receiving the item(s) 106. according to examples of the present disclosure.

In some instances, the item(s) 106 being banded may first be scanned, or otherwise identified, for determining a placement of the item(s) 106 on the platform 102. For example, as the item(s) 106 arrive at the bundling system 100, or a station associated with the bundling system 100, the item(s) 106 may be scanned. In response to scanning, lighting element(s) 800 of the bundling system 100 (or otherwise within the environment) may illuminate a region 802 on the platform 102 and/or the rod(s) 104 corresponding to the determined placement of the item 106. The region 802 that is illuminated may provide a visual indication to the human operator as to the placement of the item 106 on the platform 102, or which rod(s) 104 the item 106 is to be placed on. In some instances, the region 802 that is illuminated may be based on dimension(s) of the item 106, a shape of the item 106, a weight of the item 106, and/or a number of item(s) 106 that are to be bundled.

In some instances, the region 802 that is illuminated may be a per item basis, such that as item(s) 106 are scanned, a new region on the platform 102 is illuminated. Alternatively, the region 802 that is illuminated may be based on the item(s) 106 that are to be bundled. For example, if four item(s) 106 are to be bundled together, a region for the four item(s) 106 may be illuminated, where the region 802 represents an area for the four item(s) 106. In some instances, if the region 802 include more than one item 106, the lighting element(s) 800 may output different light (e.g., color) within different portions of the region 802. For example, within the region 802, a first color of light (e.g., blue) may be output for a first item, a second color of light (e.g., red) may be output for a second item, and so forth. The human operator may then match the size/shape of the item(s) to the color-coordinated portions in the region 802.

In some instances, those rods 104 within the region 802 may not be retracted until the item(s) 106 are placed on the rod(s) 104. For example, in FIG. 8B, the rod(s) 104 within the region 802 may not be retracted until the item(s) 106 are placed on the rod(s) 104. Comparatively, in FIG. 8C, the rod(s) 104 within the region 802 may be proactively retracted for forming a pocket 804 in which the item(s) 106 are to be placed. For example, the rods 104 may be proactively retracted for receiving the item(s) 106.

Figure 9A:
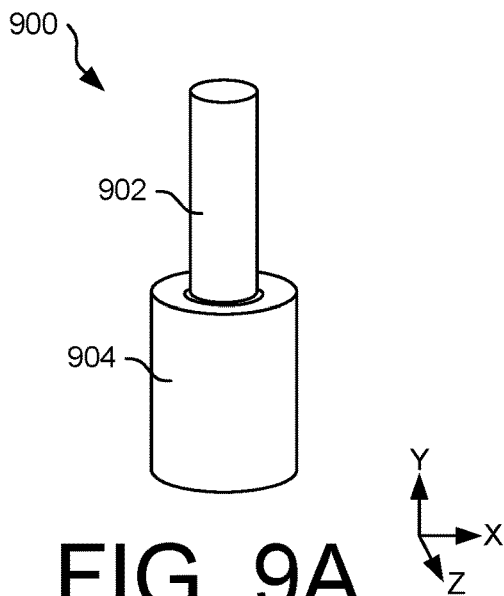
FIGS. 9A and 9B illustrate an example rod of the platform of the bundling system of FIG. 1, according to examples of the present disclosure.
Figure 9B:
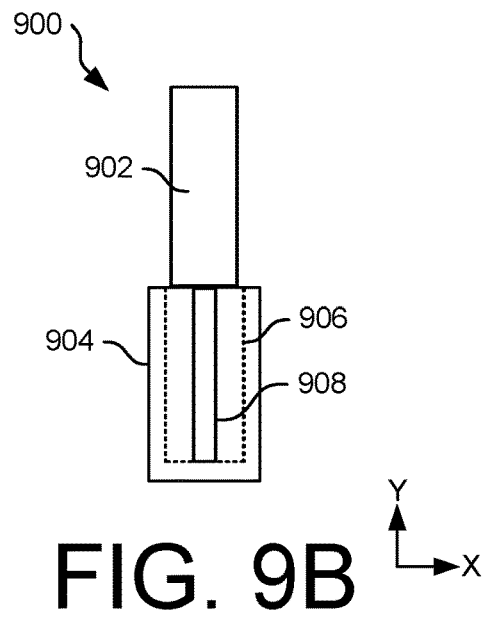

FIGS. 9A and 9B illustrate an example rod 900, according to examples of the present disclosure. The rod 900 may include a shaft portion 902 that extends from a base portion 904. The shaft portion 902 may extend from the base portion 904 by varying lengths, and have a range of travel (e.g., in the Y-direction). The base portion 904 may couple to the platform 102, and/or in some instances, the base portion 904 may be disposed below the platform 102, and the shaft portion 902 may extend through channels, openings, etc. in the platform 102.

The base portion 904 may define a receptacle 906 into which the shaft portion 902 may retract, for example, in response to an item 106 being placed on the rod 900. Within the receptacle 906, the shaft portion 902 may couple to an actuator 908, which may be pneumatically, hydraulically, and/or electronically controlled. For example, the actuator 908 may be actuated to retract the shaft portion 902 into the base portion 904 in response to detecting an item 106 being placed on the shaft portion 902. In some instances, the actuator 908 may represent a screw drive, a linear actuator, etc. that is configured to actuate the shaft portion 902. Although not shown, pumps, valves, circuitry, motor(s), etc. may be communicatively to the actuator 908.

Additionally, in some instances, the actuator 908 may be replaced with a biasing element, such as a spring, gas cylinder, and so forth. For example, upon an item 106 being placed on the shaft portion 902, the shaft portion 902 may retract into the base portion 904 based upon a weight of the item 106. In these instances, the biasing elements may not be controlled, but may extend and retract on their own, and when the items 106 are placed on the shaft portion 902.

Figure 10A:
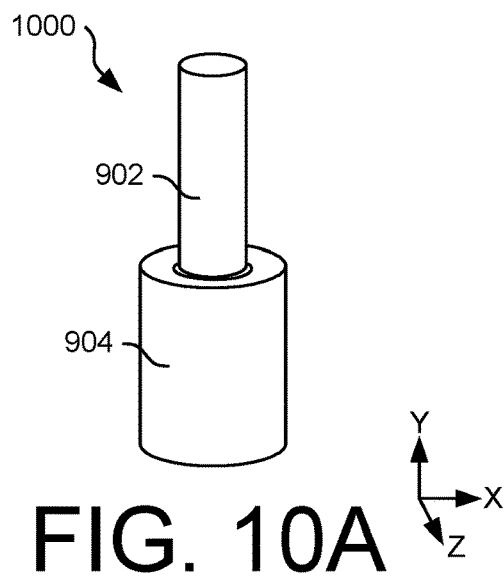
FIGS. 10A and 10B illustrate an example rod of the platform of the bundling system of FIG. 1, according to examples of the present disclosure.
Figure 10B:
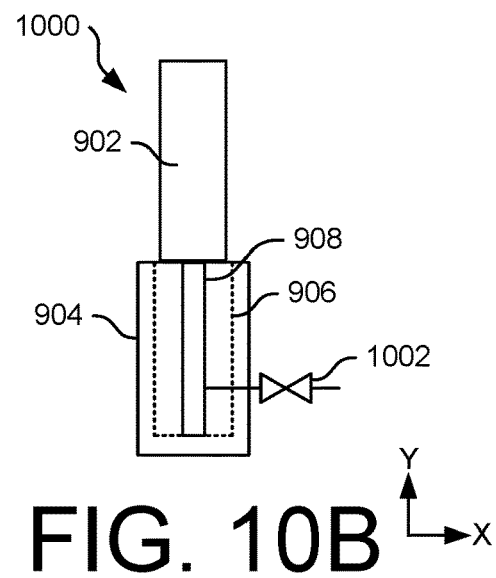

FIGS. 10A and 10B illustrate an example rod 1000, according to examples of the present disclosure. The rod 1000 may be similar to the rod 900, however, as shown, a valve 1002 (e.g., check valve) may be fluidly connected to the actuator 908. For example, the actuator 908 may be an air cylinder coupled between a base of the receptacle 906 and end of the shaft portion 902. When an item 106 is placed on the shaft portion 902, the shaft portion 902 may retract into the base portion 904 (e.g., under a weight of the item 106). The valve 1002 may maintain a position of the shaft portion 902, for example, to prevent the shaft portion 902 extending further from the base portion 904 as the item 106 resides thereon. In other instances, air within the actuator 908 may be vacuumed out to retract the shaft portion 902 into the base portion 904.

Although the valve 1002 is shown at a certain location, and/or being fluidly connected the actuator 908, in some instances, the valve 1002 may fluidly connect to the receptacle 906. In such instances, the actuator 908 may be omitted and air may be supplied into the receptacle 906 for extending the shaft portion 902, and vacuumed out to retract the shaft portion 902. An interface between the shaft portion 902 and the base portion 904 (e.g., with the receptacle 906) may include a gasket to prevent seal the receptacle 906.

Figure 11A:
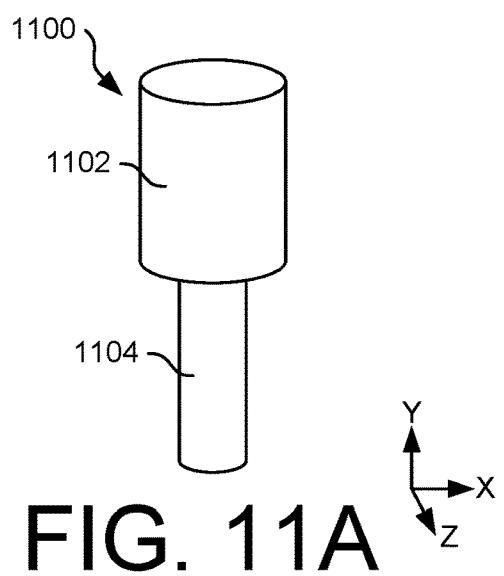
FIGS. 11A and 11B illustrate an example rod of the platform of the bundling system of FIG. 1, according to examples of the present disclosure.
Figure 11B:
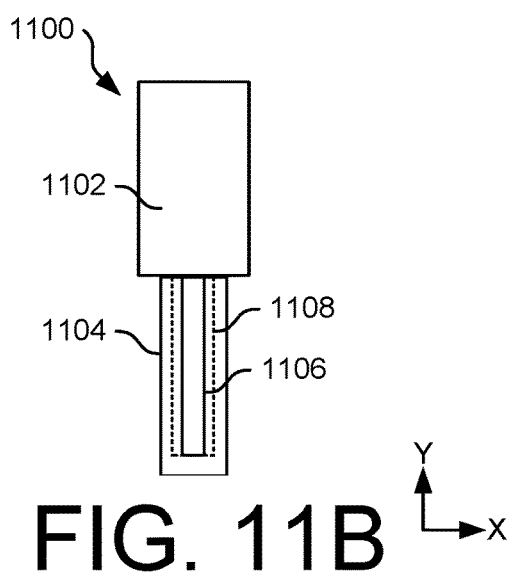

FIGS. 11A and 11B illustrate an example rod 1100, according to examples of the present disclosure. In some instances, the rod 1100 may be similar to the rod 900, however, as shown, a shaft portion 1102 of the rod 1100 may retract over the base portion 1104 (e.g., as compared to within). Here, the actuator 1106, for example, within a receptacle 1108 may retract the shaft portion 1102 over the base portion 1104. A functionality of the rod 1100 may otherwise be similar to the rod 900 and/or the rod 1000.

Figure 12:
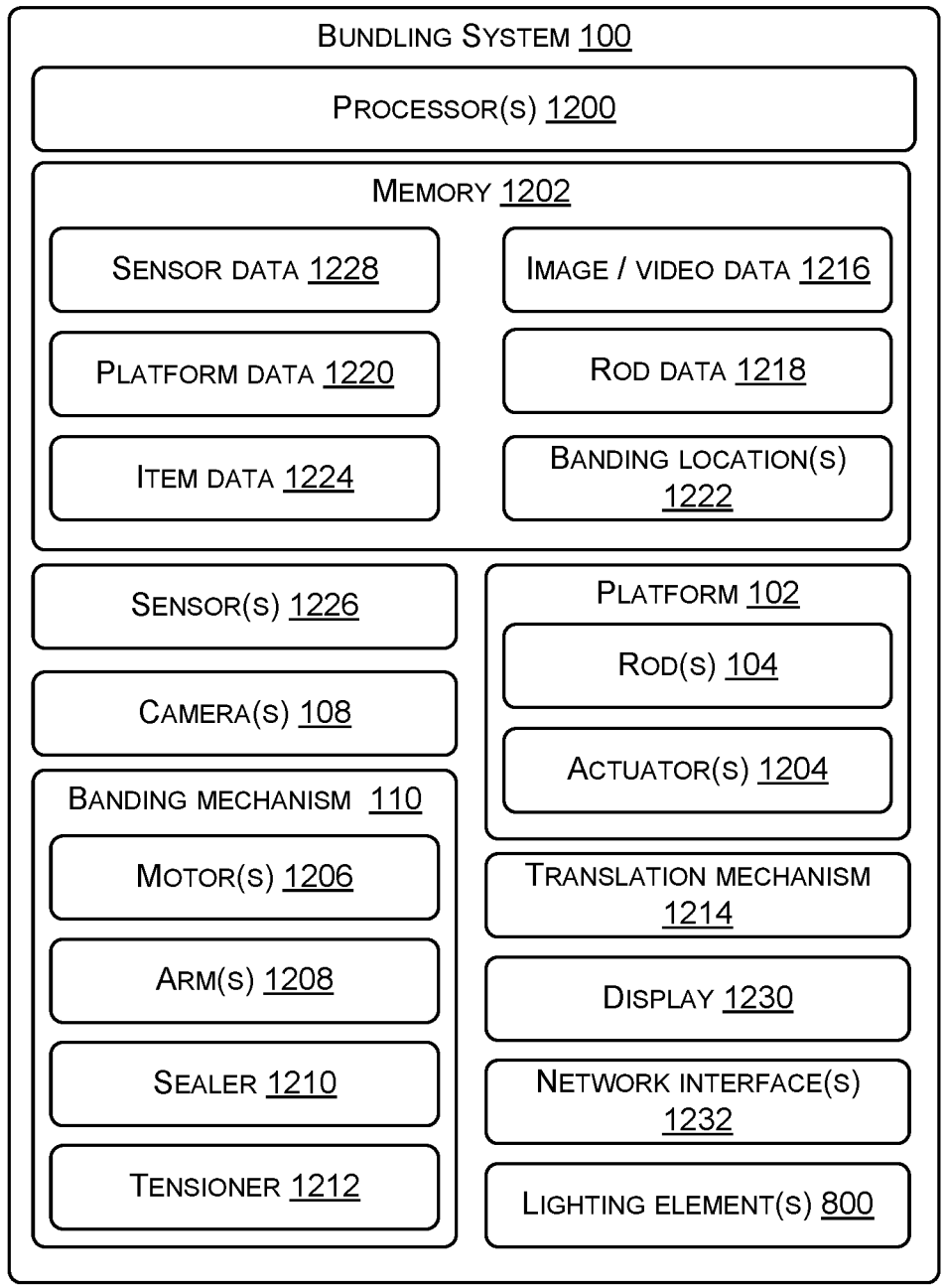
FIG. 12 illustrates select components of the bundling system of FIG. 1, according to examples of the present disclosure.

FIG. 12 illustrates example components of the bundling system 100, according to examples of the present disclosure. The bundling system 100 is shown including processor(s) 1200 and memory 1202, where the processor(s) 1200 may perform various functions and operations associated with banding the item(s) 106, and the memory 1202 may store instructions executable by the processor(s) 1200 to perform the operations described herein.

As introduced above, the bundling system includes the platform 102 having the rod(s) 104, where the rod(s) 104 form a bed for receiving the item(s) 106. The platform 102 may include any suitable size and shaft for receiving the item(s) 106, and any number of rod(s) 104 may be included on the platform 102. The rod(s) 104 may be individually, or collectively, actuatable via one or more actuator(s) 1204 (e.g., the actuator 908 and/or 1106). For example, electric motors may control the rod(s) 104 to cause the rod(s) 104 to retract and extend. However, pneumatic or hydraulic actuator(s) 1204 may additionally or alternatively be used. Still, in some instances, the bundling system 100 may utilize passive mechanisms, just as gas cylinders or biasing elements (e.g., springs) for permitting the rod(s) 104 to retract. The actuator(s) 1204, or the rod(s) 104, may be coupled to other valve(s), pump(s), air supplies, etc. for at least partially controlling their operation. Further, the platform 102 may have various conduits, wiring, etc. for controlling the operation of the rod(s) 104. For example, control wire(s) and/or supply lines may route around, on, or within the platform 102 to the rod(s) 104, respectively, for permitting control of their operation.

The bundling system 100 further includes the banding mechanism 110 for banding the item(s) 106 together. The banding mechanism 110 may include motor(s) 1206 that actuate arm(s) 1208 for placing band(s) 112 around the item(s) 106. For example, the motor(s) 1206 may position the arm(s) 1208 between adjacent rod(s) 104, such as a space between the rod(s) 104, for wrapping the band(s) 112 around the item(s) 106. The banding mechanism 110 may further include a sealer 1210 and a tensioner 1212 for securing the band(s) 112. The sealer 1210, for example, may cut banding material and seal ends or portions of the banding material together. The banding material may be paper-based, plastic-based, composite-based, etc. In some instances, the sealer 1210 may crimp, melt, stich, etc. portions of the banding material together to form the band(s) 112. Additionally, the tensioner 1212 may pull or otherwise tension the banding material during formation of the band(s) 112, to ensure that the band(s) 112 secure the item(s) 106. The banding mechanism 110 may form any number of band(s) 112 around the item(s) 106, and may form band(s) 112 at different lengths, orientations, directions, and so forth. As will be explained herein, the processor(s) 1200 may control the banding mechanism 110 for placing the band(s) 112 at certain locations around the item(s) 106.

Although the bundling system 100 is described as including the banding mechanism 110, in some instances, the banding mechanism 110 may be omitted and instead, a human operator may perform the banding. As such, the banding of the item(s) 106 may be automated (e.g., via the banding mechanism 110), manual (e.g., via the human operator), and/or semi-automated (e.g., via the banding mechanism 110 and the human operator).

The bundling system 100 includes a translation mechanism 1214 that may couple to the platform 102 and/or the banding mechanism 110. The translation mechanism 1214 may reposition the platform 102 and/or the banding mechanism 110 in order for the band(s) 112 to be placed at different locations around the item(s) 106. For example, after placing a first band around the item(s) 106, the translation mechanism 1214 may cause the platform 102 and/or the banding mechanism 110 to translate along one or more axes and/or about one or more axes, for placing a second band around the item(s) 106. In this manner, the translation mechanism 1214 may move the platform 102 and/or the banding mechanism 110 such that the band(s) 112 may be placed around the item(s) 106 at different locations.

In some instances, the translation mechanism 1214 may include various actuator(s) that control movement of the platform 102 and/or the banding mechanism 110 (e.g., turntables, linear actuators, motors, etc.). Additionally, the translation mechanism 1214 may include a series of rails, tracks, etc. for moving the platform 102 and/or the banding mechanism 110. For example, the actuator(s) of the translation mechanism 1214 may include carriages that translate along one or more rails for moving the platform 102 and/or the banding mechanism 110. The actuator(s) and the tracks, for example, may permit the translation mechanism 1214 to move the platform 102 and/or the banding mechanism 110 along one or more axes, whether simultaneously or consecutively, and/or about one or more axes, whether simultaneously or consecutively.

The bundling system 100 includes the camera 108. In some instances, the camera 108 may be oriented overhead or alongside the platform 102 and the rod(s) 104 for imaging the rod(s) 104 and the placement of the item(s) 106 on the rod(s) 104. Any number of the camera(s) 108 may be included. In some instances, the camera(s) 108 may include RGB camera(s), depth camera(s), etc. Moreover, in some instances, the camera(s) 108 may be movable along one or more axes, and/or about one or more axes, for changing a field of view of the camera(s) 108, respectively.

The camera(s) 108 are configured to generate image/video data 1216. The image/video data 1216 may analyzed to determine where the item(s) 106 have been placed, and subsequently, used to control certain rod(s) 104 to retract. As an example, once the image/video data 1216 is analyzed to determine the placement of the item(s) 106 on the platform 102, certain rod(s) 104 may be instructed to retract to form a pocket for retaining the item(s) 106. To control the rod(s) 104, the memory 1202 is shown storing or having access to rod data 1218, which may indicate identifier(s), a position, extension/retraction of the rod(s) 104, respectively. As such, the rod data 1218 may be used to individually communicate and/or control the rod(s) 104 for causing the rod(s) 104 to retract and extend, respectively. Further, the memory 1202 may also have access to or store the platform data 1220, which may include a size of the platform 102, placement of the rod(s) 104 on the platform 102 (e.g., coordinate position(s) of the rod(s) 104), etc. Once the location of the item(s) 106 on the platform 102 is known, the platform data 1220 may be used to determine which rod(s) 104 to retract and the rod data 1218 may be used to control those rod(s) 104.

Additionally, the image/video data 1216 is used to determine banding location(s) 1222 for the item(s) 106. For example, as item(s) 106 are placed on the rod(s) 104, the image/video data 1216 may be used to determine a location of the item(s) 106. That is, the image/video data 1216 may be analyzed to determine where the item(s) 106 have been placed on the platform 102, or what rod(s) 104 the item(s) 106 have been placed on. Knowing where the item(s) 106 have been placed permits the banding location(s) 1222 to be determined for banding the item(s) 106 together. As an example, to band two item(s) 106 together, the image/video data 1216 may be used to determine whether the two item(s) 106 are located, and where to instruct the banding mechanism 110 to place the band(s) 112. During this process, the translation mechanism 1214 may control the platform 102 and/or the banding mechanism 110 such that the band(s) 112 may be placed at different banding location(s) 1222.

In some instances, the number of banding location(s) 1222 may be based on dimension(s) of the item(s) 106, a weight of the item(s) 106, a shape of the item(s) 106, etc. In some instances, the dimension(s), shape, weight, etc. of the item(s) 106 may be determined via the image/video data 1216. For example, in analyzing the image/video data 1216, the dimension(s) of the item(s) 106 may be determined. Various computer-vision, object detector, feature extraction techniques, etc. may be utilized. In some instances, these characteristic(s) of the item(s) 106 of the item(s) 106 may be stored within the memory 1202 for use in determining the banding location(s) 1222. For example, the dimension(s), shape, weight, etc. of the item(s) 106 may be stored as item data 1224 in the memory 1202, and used by the bundling system 100 to determine the banding location(s) 1222.

The banding location(s) 1222 may be expressed as coordinate position(s) on the platform 102. For example, the banding location(s) 1222 may be associated with coordinate position(s) and the banding mechanism 110 may be controlled to place the band(s) 112 at the coordinate position(s) corresponding to the banding location(s) 1222. The coordinate positions, for example, may indicate that the band(s) 112 are to span a certain length, height, and/or width across the item(s) 106. The coordinate positions of the banding location(s) 1222 may also be used by the translation mechanism 1214 for controlling the platform 102 and/or the banding mechanism 110 for disposing the band(s) 112 at the banding location(s) 1222.

Still, in some instances, the image/video data 1216 may be analyzed to determine optimum banding location(s) 1222 for banding the item(s) 106 together. For example to band a spherical shaped item to another item, a band may be disposed through a center of the spherical shaped item. If the band it not located through the center, the spherical shaped item may be at risk of reorienting. Moreover, to secure the spherically shaped item, more than one band may be placed. In some instances, trained algorithms or machine-learned (ML) model(s) may be used to determine the placement of the band(s) 112. For example, the algorithms or trained ML model(s) may receive the image/video data 1216 generated by the camera(s) 108, a shape of the detected object(s) (e.g., item(s) 106), a size of the item(s) 106, a weight of the item(s) 106, a number of the item(s) 106, and so forth. The algorithms or trained ML model(s) may then output the banding location(s) 1222, which are used by the banding mechanism 110 and/or the translation mechanism 1214, or more generally, the bundling system 100, for banding the item(s) 106 together at the banding location(s) 1222. Different algorithms and/or trained ML model(s) may also be used to determine the dimension(s), shape, number of item(s) 106, and so forth.

In some instances, to determine the banding location(s) 1222, rod data 1218 may be used. The rod data 1218 may indicate which of the rod(s) 104 the item(s) 106 are located on. For example, knowing which of the rod(s) 104 receive the item(s) 106 may be used to determine the location of the item(s) 106 on the platform 102, and the dimensions of the item(s) 106. In conjunction with the rod data 1218, the memory 1202 may have access to or store the platform data 1220, which may indicate a placement of the rod(s) 104 on the platform 102. In other word(s), the rod data 1218 and the platform data 1220 may be used to determine the placement of the item(s) 106 on the platform 102, and which rod(s) 104 receive the item(s) 106, which in turn, may be used to determine a size of the item(s) 106 and where to place the band(s) 112.

The bundling system 100 may include other sensor(s) 1226, such as photoelectric sensor(s), laser range finders, pressure sensor(s), strain gauges, position sensor(s), and so forth that generate sensor data 1228. The sensor data 1228 may be used to determine the placement of the item(s) 106 on the platform 102, for example, or which rod(s) 104 are retracted. For example, the sensor(s) 1226 may be coupled to or sense a retraction of the rod(s) 104. Knowing which rod(s) 104 are retracted may indicate a placement of the item(s) 106, and in turn, used to determine a size of the item(s) 106 to be bundled. This size may correspondingly be used when determining the banding location(s) 1222.

The sensor(s) 1226 may also be used to ensure that there are no disturbances, obstructions, safety concerns, etc. prior to banding the item(s) 106 sensor(s). For example, the sensor(s) 1226 may determine whether the human operator and/or the robotic device are free and clear of the platform 102 and/or the rod(s) 104. Here, the sensor(s) 1226 may be used to restrict the banding mechanism 110 banding the item(s) 106 if an area, perimeter, etc. of the platform 102 is breached.

In some instances, the rod(s) 104 may be proactively retracted prior to the item(s) 106 being placed on the platform 102. For example, noted above, the image/video data 1216 may be analyzed to determine the placement of the item(s) 106 on the platform 102. However, in some instances, before placement of the item(s) 106 on the platform 102, the item(s) 106 may be scanned (e.g., via a barcode, code, identifier, etc.) for use in determining characteristics of the item(s) 106, such as a shape, dimension(s), weight, packaging material (e.g., foldable, deformable, etc.), and so forth. In some instances, the characteristic(s) of the item(s) 106 may be stored as the item data 1224, and the item data 1224 may be determined via scanning the barcode on the item 106. To scan the barcode, the human operator or robotic device may have suitable device(s) (e.g., scanner, imager, etc.).

Using the item data 1224, the bundling system 100 may determine a location at which to place the item(s) 106 on the platform 102. The rod(s) 104 at the location may be retracted, prior to the item(s) 106 being placed onto the platform 102, so as to provide a pocket for receiving the item(s) 106. The platform data 1220 and the rod data 1218 may be used to determine the placement of the item(s) 106 and controlling certain rod(s) 104 to retract. The proactive retraction of the rod(s) 104 may provide a visual indication to the human operator as to where the item(s) 106 is/are to be placed. Therein, after placing the item(s) 106 on the platform 102, or on the at least partially retracted rod(s) 104, another item 106 may be scanned and subsequently, other rod(s) 104 may retract for receiving the other item 106.

The lighting element(s) 800 may illuminate the region 802 on the platform 102 corresponding to the determined placement of the item 106. The region 802 that is illuminated may provide a visual indication to the human operator as to the placement of the item 106 on the platform 102, or which rod(s) 104 the item 106 is to be placed on. In some instances, the region 802 that is illuminated may be based on dimension(s) of the item 106, a shape of the item 106, a weight of the item 106, and/or a number of item(s) 106 that are to be bundled. In some instances, the region 802 that is illuminated by the lighting element(s) 800 may be a per item basis, such that as item(s) 106 are scanned, a new region on the platform 102 is illuminated. Alternatively, the region 802 that is illuminated may be based on the item(s) 106 that are to be bundled. For example, if four item(s) 106 are to be bundled together, a region for the four item(s) 106 may be illuminated, where the region 802 represents an area for the four item(s) 106. In some instances, if the region include more than one item 106, the lighting element(s) 800 may output different light (e.g., color) within different portions of the region 802. The lighting element(s) 800 may also be used to output light within or at area(s) corresponding to the banding location(s) 1222, for example, to assist the human operator in placing the band(s) 112.

The bundling system 100 may include a display 1230 that is used to control an operation of the bundling system 100. For example, the display 1230 may represent a touch-sensitive interface configured to receive input from the human operator. The human operator may control various operations of the bundling system 100 via the display 1230, such as retracting and extending the rod(s) 104, causing the banding mechanism 110 to place the band(s) 112, controlling a movement of the translation mechanism 1214, and so forth.

After being banded, the item(s) 106 may be removed from the platform 102. In some instances, the human operator may manually remove the item(s) 106 from the platform 102, place the item(s) 106 into a package for shipment, place the item(s) 106 onto a conveyor for further processing, and so forth. Alternatively, the robotic device may remove the item(s) 106. In some instances, knowing which rod(s) 104 are retracted may be used to create a box, or package, for the item(s) 106. For example, the size of the item(s) 106 bundled together may be used in a downstream process to create a package for receiving the item(s) 106. In some instances, those rod(s) 104 that are retracted may be extended after banding for ease of removal. For example, once extended, the item(s) 106 may be conveniently lifted off the platform 102, slide across a top of the rods, and so forth.

The bundling system 100 may include one or more network interface(s) 1232 configured to send and/or receive wireless signals for communicating with other devices, such as the remote device(s). In some instances, the one or more network interface(s) 1232 may operate in conjunction with one or more wireless units to implement one or more of various wireless technologies, such as Wi-Fi, Bluetooth, RF, cellular, satellite, NFC (near-field communication), RFID (radio frequency identification), and so on. In some instances, the one or more network interface(s) 1232 may be used to communicate wirelessly with one or more remote device(s) via a network such as the internet. In some instances, the bundling system 100 may communicate in a mesh network (e.g., directly between remote device(s)) and/or via an access point.

As used herein, a processor, such as the processor(s) 1200, may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 1202, may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 13:
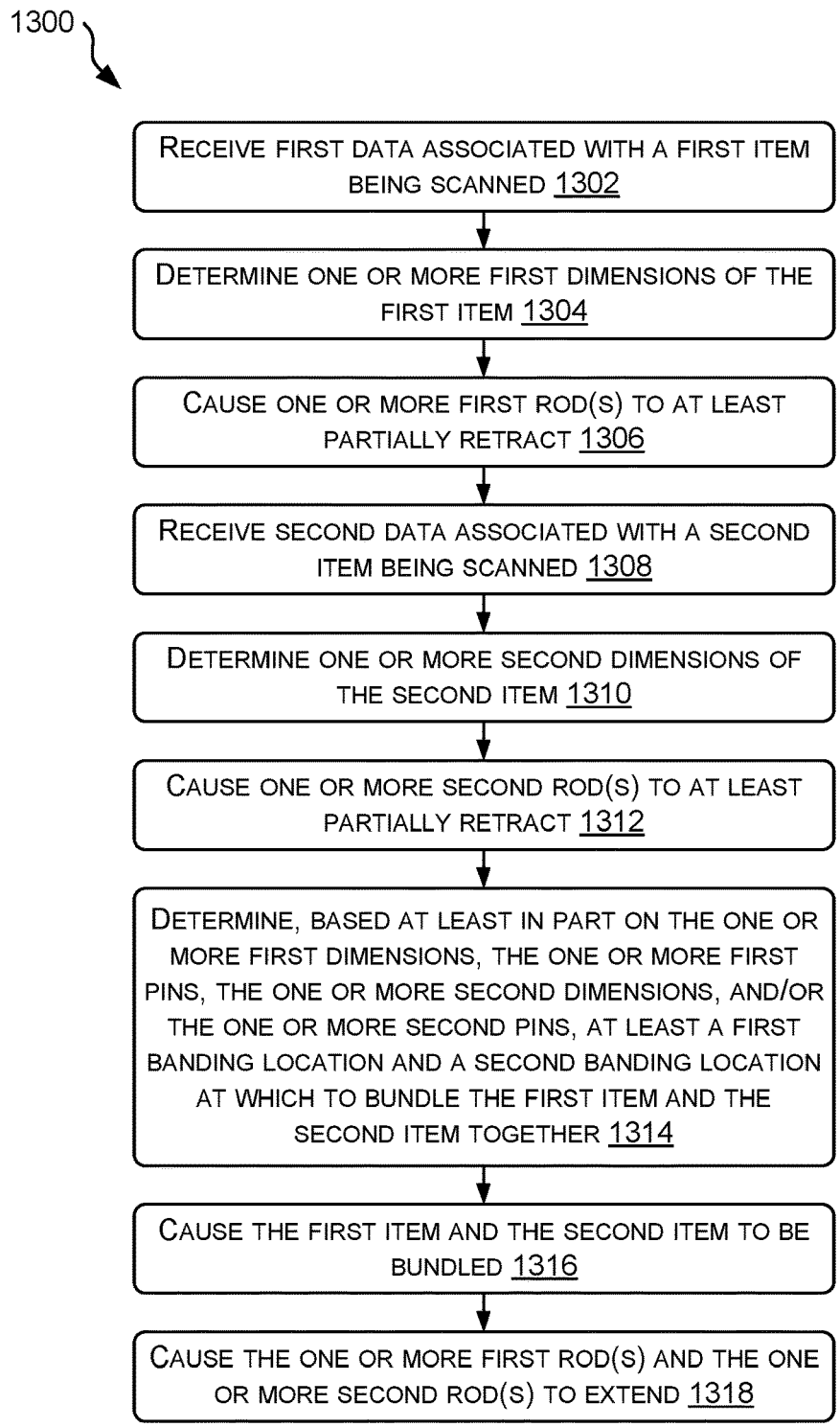
FIG. 13 illustrates an example process for retracting rods of the bundling system of FIG. 1 for accommodating one or more items, according to examples of the present disclosure.
Figure 14:
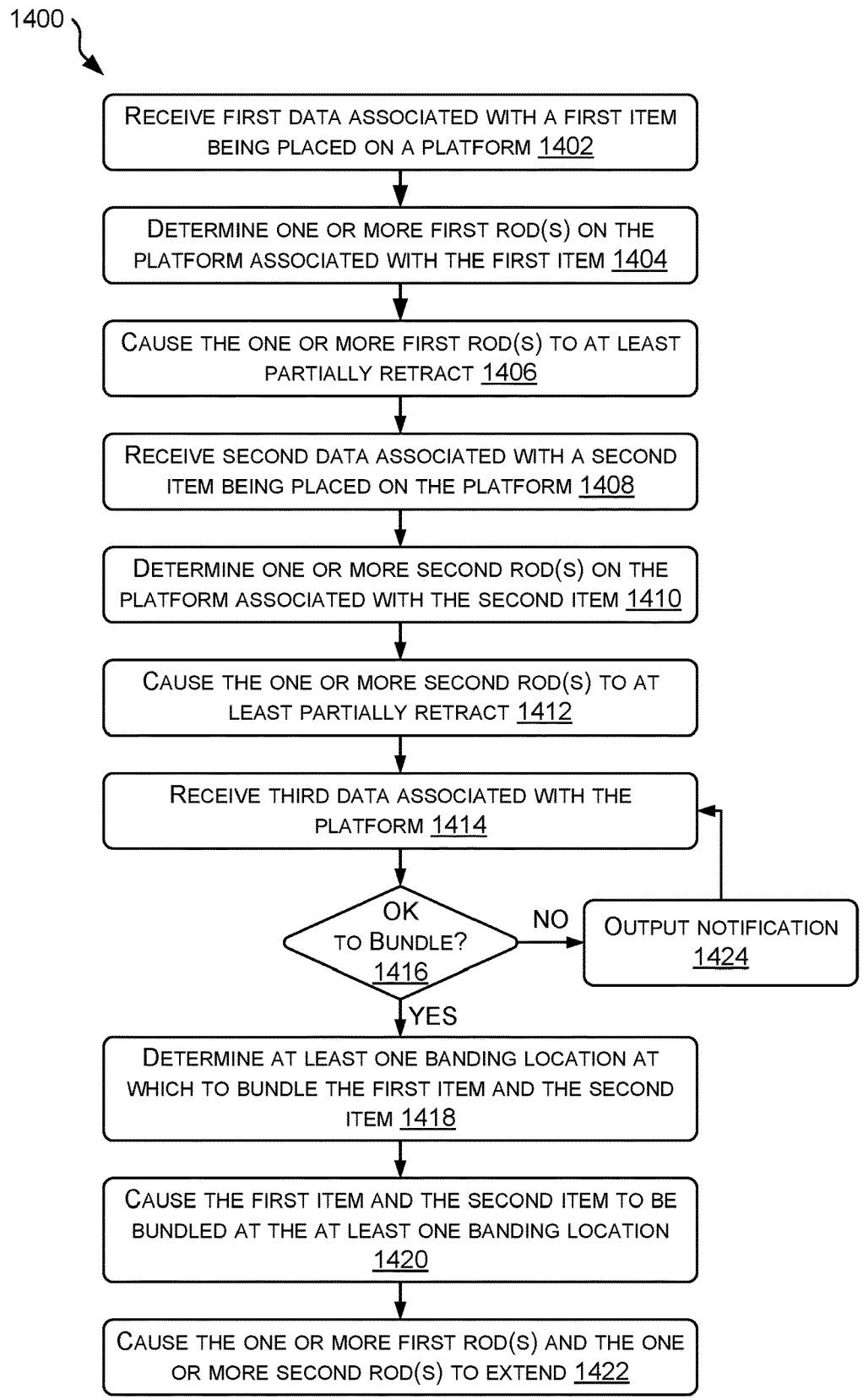
FIG. 14 illustrates an example process for detecting a placement of one or more items on the platform of the bundling system of FIG. 1, according to examples of the present disclosure.
Figure 15:
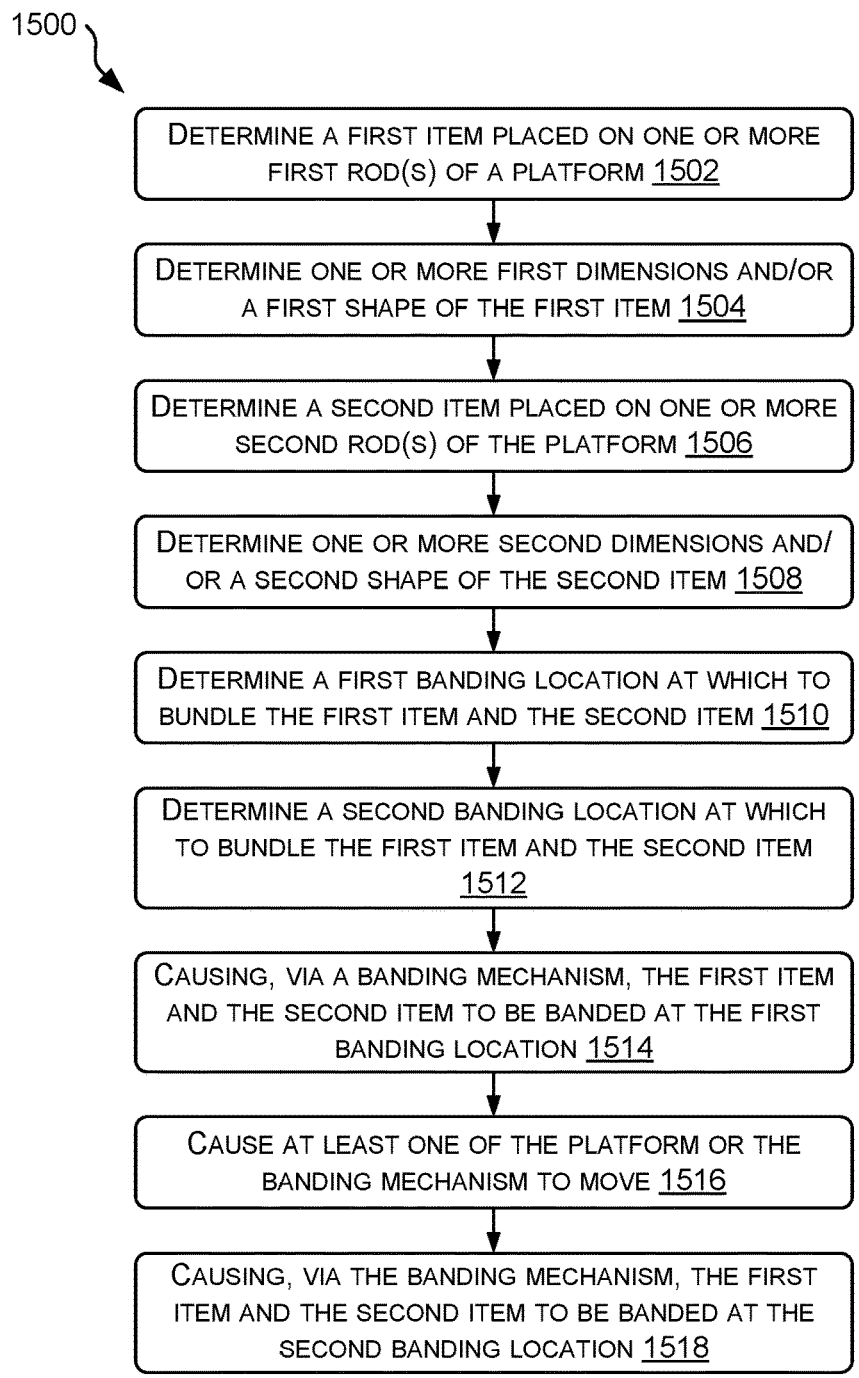
FIG. 15 illustrates an example process for determining banding locations using the bundling system of FIG. 1, according to examples of the present disclosure.

FIGS. 13-15 illustrates example processes for banding item(s). The processes described herein is illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, devices, and systems described in the examples herein, such as, for example those described with respect to FIGS. 1-12, although the processes may be implemented in a wide variety of other environments, architectures, devices, and systems.

FIG. 13 illustrates an example process 1300 for retracting rods of the bundling system 100, according to examples of the present disclosure. At 1302, the process 1300 may include receiving first data associated with a first item being scanned. For example, the bundling system 100 may receive, from a device used by a human operator, the first data. In some instances, the device may represent a handheld device including a scanner that is configured to scan (e.g., image) an identifier on the item 106 (e.g., barcode, QR code, etc.). In other instances, the device may represent a device disposed about an environment in which the bundling system 100 resides, such as an overhead camera, for scanning the first item. The first item may arrive at the bundling system 100 as a group of item(s) to be bundled, or may arrive individually at the bundling system 100.

At 1304, the process 1300 may include determining one or more first dimension(s) of the first item. For example, based at least in part on the first data, the bundling system 100 may determine dimension(s) of the first item. The bundling system 100 may utilize the item data 1224 associated with the first item for determining the dimension(s). Additionally, or alternatively, the bundling system 100 may determine a shape, weight, and/or other characteristic(s) of the first item, such as a packaging material of the first item, as stored within the item data 1224, or as otherwise determined from scanning the first item.

At 1306, the process 1300 may include causing one or more first rod(s) to at least partially retract. For example, the bundling system 100 may cause one or more first rod(s) on the platform 102 to at least partially retract for receiving the first item. In some instances, the first rod(s) that are retracted may be based at least in part on the one or more first dimension(s) of the first item. That is, knowing a size of the first item may be used to determine an area or footprint on the platform 102 that needs to be retracted for forming the pocket that receives the first item. In some instances, the bundling system 100 utilizes the platform data 1220 and the rod data 1218 for determining a placement of the first item, as well as for controlling the rod(s) 104. That is, once the bundling system 100 determines a location on the platform 102 that the first item is to be placed, the bundling system 100 may cause those rod(s) 104 to at least partially retract. Retracting the rod(s) 104 for the first item creates a pocket to secure the item(s) 106 for bundling and to prevent the first item shifting, reorienting, etc.

In some instances, the rod(s) 104 that are retracted for the first item may be based on a number of item(s) 106 to be banded. For example, if ten item(s) 106 are to be banded, the rod(s) 104 that are retracted may be located in a center of the platform 102. Comparatively, if a smaller number of item(s) 106 are to be banded, the rod(s) 104 that are retracted may be located near a perimeter of the platform 102. In some instances, the item(s) 106 may be placed in any configuration that may optimize the overall dimensions and/or volume (e.g., for packaging). Here, the rod(s) 104 that are retract may optimize the overall dimensions and/or volume of the bundled item(s).

At 1308, the process 1300 may include receiving second data associated with a second item being scanned. For example, the bundling system 100 may receive, from the device used by the human operator or another device in an environment, the second data. The second item may arrive at the bundling system 100 as a group of item(s) to be bundled, or may arrive individually at the bundling system 100.

At 1310, the process 1300 may include determining one or more second dimension(s) of the second item. For example, based at least in part on the second data, the bundling system 100 may determine dimension(s) of the second item. The bundling system 100 may utilize the item data 1224 associated with the second item for determining the dimension(s). Additionally, or alternatively, the bundling system 100 may determine a shape, weight, and/or other characteristic(s) of the second item, as stored within the item data 1224, or as otherwise determined from scanning the second item.

At 1312, the process 1300 may include causing one or more second rod(s) to at least partially retract. For example, the bundling system 100 may cause one or more second rod(s) on the platform 102 to at least partially retract for receiving the second item. In some instances, the second rod(s) that are retracted may be based at least in part on the one or more second dimension(s) of the second item. That is, knowing a size of the second item may be used to determine an area or footprint on the platform 102 that needs to be retracted for forming the pocket that receives the second item. In some instances, the bundling system 100 utilizes the platform data 1220 and the rod data 1218 for determining a placement of the second item, as well as for controlling the rod(s) 104. That is, once the bundling system 100 determines a location on the platform 102 that the first item is to be placed, the bundling system 100 may cause those rod(s) 104 to at least partially retract.

In some instances, the rod(s) 104 that are retracted for the second item may be adjacent to the rod(s) 104 that are retracted for the first item. That is, being as the first item and the second item are to be bundled together, the first item and the second item may be placed adjacent to one another on the platform 102, and therefore, the rod(s) 104 that receive the first item may be adjacent to the rod(s) 104 that receive the second item. The rod(s) 104 that receive the second item may optimize the overall dimensions and/or volume of the bundled item(s).

At 1314, the process 1300 may include determining, based at least in part on the one or more first dimensions, the one or more first rod(s), the one or more second dimensions, and/or the one or more second rod(s), at least a first banding location and a second banding location at which to bundle the first item and the second item together. For example, knowing the placement of the first item and the second item on the platform 102, via which rod(s) 104 are retracted, and/or the dimensions of the first item and the second item, may be used to determine how to band the items 106 together. In some instances, the banding location(s) 1222 may additionally be based on a shape, a weight of the first item and/or the second item, the number of items 106 to be banded, a packaging material of the first item and/or the second item, and so forth. The banding location(s) 1222 may also be at positions between the rod(s) 104 such that the banding mechanism 110 is able to wrap the band(s) 112 around the item(s).

In some instances, the banding location(s) 1222 may be expressed as coordinate position(s) on the platform 102. The banding location(s) 1222, or the band(s) 112 that are placed around the item(s) 106, may be different in length, orientation, directionality, material, etc. The translation mechanism

1214 may be configured to control the platform 102 and/or the banding mechanism 110 to dispose the band(s) 112 at the determined banding location(s) 1222.

The banding location(s) 1222 may be determined via the image/video data 1216 generated by the camera 108 and/or the sensor data 1228 generated via the sensor(s) 1226. For example, the image/video data 1216 may be analyzed to determine a placement of the band(s) 112. In some instances, the band(s) 112 may be centrally placed through the item(s) 106. In some instances, the number of band(s) 112 may be based at least in part on the size of the item(s) 106, the shape of the item(s) 106, and/or the weight of the item(s) 106. In some instances, trained algorithms or machine-learned (ML) model(s) may be used to determine the placement of the band(s) 112. For example, the algorithms or trained ML model(s) may receive the image/video data 1216 generated by the camera(s) 108 and/or the sensor data 1228 generated via the sensor(s) 1226, for use in determining a shape of the detected object(s) (e.g., item(s)), a size of the item(s) 106, a weight of the item(s) 106, and so forth. The algorithms or trained ML model(s) may then output the banding location(s) 1222, which are used by the banding mechanism 110 and/or the translation mechanism 1214, or more generally, the bundling system 100, for banding the item(s) 106 together at the banding location(s) 1222.

At 1316, the process 1300 may include causing the first item and the second item to be bundled. For example, the banding mechanism 110 may place a first band at the first banding location, and a second band and the second banding location. The translation mechanism 1214 may be used to position the banding mechanism 110, or may move the platform 102 such that the banding mechanism 110 places the first band and the second band at the first banding location and the second banding location. Although two banding locations are described, the process 1300 may include determining more than two banding locations, and accordingly, more than two band(s) may be placed around the item(s) 106. Still, the process 1300 may band more than two item(s) together. Additionally, in some instances, the banding process may be performed manually, or semi-manually, by a human operator operating the bundling system.

At 1318, the process 1300 may include causing the one or more first rod(s) and the one or more second rod(s) to extend. For example, once the item(s) 106 are banded together, the banded item(s) 106 may be lifted via the rod(s) 104 extending. Extending the rod(s) 104, and lifting the item(s) 106 out of the pocket, for example, may permit the item(s) 106 to be easily removed from the platform 102, whether via the human operator or the robotic device. Regardless, prior to receive other item(s) 106 on the platform 102 (i.e., after the first item and the second item are banded together), the rod(s) 104 may be extended to create the bed of rod(s) 104 and for receiving other item(s) 106.

FIG. 14 illustrates an example process 1400 for detecting a placement of one or more items on the platform 102, according to examples of the present disclosure. At 1402, the process 1400 may include receiving first data associated with a first item being placed on a platform. For example, the camera 108 may generate image/video data 1216 of the platform 102 and the first item that is used to indicate the placement of the first item. Additionally, or alternatively, sensor(s) 1226 coupled to the rod(s) 104 may indicate a placement of the first item. For example, sensor(s) 1226 coupled to the actuator(s) 1204 of the rod(s) 104 may sense a placement of the first item 106.

At 1404, the process 1400 may include determining one or more first rod(s) on the platform associated with the first item. For example, the platform data 1220 and the rod data 1218, via mapping known locations to the placement of the rod(s) 104, may be used to determine which rod(s) 104 received the first item. In some instances, by analyzing the image/video data 1216 of the camera 108, and knowing the placement of the first item, may be used to determine which rod(s) 104 are located at the placement of the first item. In other instances, the sensor(s) 1226 of the actuator(s) 1204 may determine which rod(s) 104 received the first item.

At 1406, the process 1400 may include causing one or more first rod(s) to at least partially retract. For example, the bundling system 100 may cause one or more first rod(s) on the platform 102 to at least partially retract for receiving the first item and securing the first item within the rod(s) 104. The rod data 1218 may be used for communicating with those rod(s) 104 that are to be retracted for receiving the first item. Accordingly, those rod(s) 104 on the platform 102 onto which the first item is placed may be retracted.

At 1408, the process 1400 may include receiving second data associated with a second item being placed on the platform. For example, the camera 108 may generate image/video data 1216 of the platform 102 and the second item that is used to indicate the placement of the first item. Additionally, or alternatively, sensor(s) 1226 coupled to the rod(s) 104 may indicate a placement of the second item.

At 1410, the process 1400 may include determining one or more second rod(s) on the platform associated with the second item. For example, the platform data 1220 and the rod data 1218, via mapping known locations to the placement of the rod(s) 104, may be used to determine which rod(s) 104 received the second item. In some instances, by analyzing the image/video data 1216 of the camera 108, and knowing the placement of the second item, may be used to determine which rod(s) 104 are located at the placement of the second item. In other instances, the sensor(s) 1226 of the actuator(s) 1204 may determine which rod(s) 104 received the second item.

At 1412, the process 1400 may include causing one or more second rod(s) to at least partially retract. For example, the bundling system 100 may cause one or more second rod(s) on the platform 102 to at least partially retract for receiving the second item and securing the second item within the rod(s) 104. The rod data 1218 may be used for communicating with those rod(s) 104 that are to be retracted for receiving the second item. Accordingly, those rod(s) 104 on the platform 102 onto which the second item is placed may be retracted.

At 1414, the process 1400 may include receiving third data associated with the platform. In some instances, the third data may be generated by the camera 108 and/or other sensor(s) 1226 of the bundling system 100. For example, the third data may be indicative of whether the human operator or the robotic device is within a perimeter of the platform 102, and/or whether the item(s) 106 are ready for banding. When the item(s) 106 are ready for banding may be based on determining that all item(s) 106 to be banded have been placed on the platform 102. In some instances, the third data may be received via the display 1230 (or other input component of the bundling system 100) for determining whether to place the band(s) 112 the item(s) 106.

At 1416, the process 1400 may include determining whether the item(s) 106 are ready for bundling. For example, if the image/video data 1216 detects an object within a perimeter of the platform 102, the process 1400 may determine that the item(s) 106 are not ready to be bundled. This, for example, may prevent the banding mechanism 110 placing the band(s) 112 around the item(s) 106 while a hand, arm, etc. of the human operator is within an area of the platform 102. In other instances, whether the item(s) 106 are ready for bunding may be based on a determination that the item(s) 106 have not shifted or otherwise moved. If at 1416, the process 1400 determines that the item(s) 106 are ready for bunding, the process 1400 may follow the "YES" route and proceed to 1418.

At 1418, the process 1400 may include determining at least one banding location at which to bundle the first item and the second item together. In some instances, the placement of the first item and the second item on the platform 102, via which rod(s) 104 are retracted, and/or the dimensions of the first item and the second item, may be used to determine how to band the items 106 together. In some instances, the banding location(s) 1222 may additionally be based on a shape and/or weight of the first item and/or the second item. The banding location(s) 1222 may also be at positions between the rod(s) 104 such that the banding mechanism 110 is able to wrap the band(s) 112 around the item(s). In some instances, the banding location(s) 1222 may be expressed as coordinate position(s) on the platform 102. The banding location(s) 1222 may be determined via the image/video data 1216 generated by the camera 108 and/or the sensor data 1228 generated via the sensor(s) 1226. For example, the image/video data 1216 may be analyzed to determine a placement of the band(s) 112. In some instances, the band(s) 112 may be centrally placed through the item(s) 106. In some instances, the number of band(s) 112 may be based at least in part on the size of the item(s) 106, the shape of the item(s) 106, and/or the weight of the item(s) 106. In some instances, trained algorithms or machine-learned (ML) model(s) may be used to determine the placement of the band(s) 112.

At 1420, the process 1400 may include causing the first item and the second item to be bundled at the at least one banding location. For example, the banding mechanism 110 may place the band(s) 112 at the banding location(s) 1222. In some instances, the number of banding location(s) 1222 may be based on dimensions, a shape, and/or a weight of the first item and/or the second item. The translation mechanism 1214 may be used to position the banding mechanism 110, or may move the platform 102 such that the banding mechanism 110 places the band(s) 112 at the banding location(s) 1222.

At 1422, the process 1400 may include causing the one or more first rod(s) and the one or more second rod(s) to extend. For example, once the item(s) 106 are banded together, the banded item(s) 106 may be lifted via the rod(s) 104 extending. Extending the rod(s) 104, and lifting the item(s) 106 out of the pocket, for example, may permit the item(s) 106 to be easily removed from the platform 102, whether via the human operator or the robotic device. Regardless, prior to receive other item(s) 106 on the platform 102 (i.e., after the first item and the second item are banded together), the rod(s) 104 may be extended to create the bed of rod(s) 104 and for receiving other item(s) 106.

If at 1416 the process 1400 determines that the item(s) 106 are not ready for bundling, the process 1400 may follow the "NO" route and proceed to 1424. At 1424, the process 1400 may include causing output of a notification. For example, lights, sounds, or other feedback may be provided to indicate that the item(s) 106 are not ready to be bundled. This may include, for example, to warn the human operator to remove portions of their body from within the perimeter of the platform. From 1424, the process 1400 may loop to 1414 whereby the process 1400 may receive additional data for determining whether the item(s) 106 are ready to be bundled.

FIG. 15 illustrates an example process 1500 for determining banding locations, according to examples of the present disclosure. At 1502, the process 1500 may include determining a first item placed on one or more first rod(s) of a platform. For example, the camera 108 may generate image/video data 1216 of the platform 102 and the first item that is used to indicate, or otherwise detect, the placement of the first item. Additionally, or alternatively, sensor(s) 1226 coupled to the rod(s) 104 may indicate a placement of the first item. For example, sensor(s) 1226 coupled to the actuator(s) 1204 of the rod(s) 104 may sense a placement of the first item 106 (e.g., weight).

At 1504, the process 1500 may include determining one or more first dimension(s) and/or a first shape of the first item. For example, the image/video data 1216 may be analyzed to determine the one or more first dimension(s) and/or the shape. Computer vision, object detection, or other techniques may be utilized to determine the dimensions and/or the shape of the first item. Moreover, in some instances, sensor data 1228 generated by sensor(s) 1226 monitoring the rod(s) 104 may be used to determine which rod(s) 104 have received an item, which in turn, may be used to determine the dimensions and/or the shape.

At 1506, the process 1500 may include determining a second item placed on one or more second rod(s) of a platform. For example, the camera 108 may generate image/video data 1216 of the platform 102 and the second item that is used to indicate, or otherwise detect, the placement of the second item. Additionally, or alternatively, sensor(s) 1226 coupled to the rod(s) 104 may indicate a placement of the second item. For example, sensor(s) 1226 coupled to the actuator(s) 1204 of the rod(s) 104 may sense a placement of the second item 106 (e.g., weight).

At 1508, the process 1500 may include determining one or more second dimension(s) and/or a second shape of the second item. For example, the image/video data 1216 may be analyzed to determine the one or more second dimension(s) and/or the shape. Computer vision, object detection, or other techniques may be utilized to determine the dimensions and/or the shape of the second item. Moreover, in some instances, sensor data 1228 generated by sensor(s) 1226 monitoring the rod(s) 104 may be used to determine which rod(s) 104 have received an item, which in turn, may be used to determine the dimensions and/or the shape.

At 1510, the process 1500 may include determining a first banding location at which to bundle the first item and the second item. In some instances, the first banding location may be based at least in part on the dimensions of the first item and/or the second item, and/or the shape of the first item and the second item. In some instances, the first banding location may be determined so as to be disposed through a center of the item(s). The first banding location may also have a certain orientation, or directionality. The first banding location may be associated with certain coordinate positions on the platform 102.

At 1512, the process 1500 may include determining a second banding location at which to bundle the first item and the second item. In some instances, the second banding location may be based at least in part on the dimensions of the first item and/or the second item, and/or the shape of the first item and the second item. In some instances, the second banding location may be determined so as to be disposed through a center of the item(s), in an orientation or directionality that is different than the first banding location. The second banding location may be associated with certain coordinate positions on the platform 102.

At 1514, the process 1500 may include causing, via a banding mechanism, the first item and the second item to be banded at the first banding location. For example, the translation mechanism 1214 may maneuver the banding mechanism 110 into position or otherwise at the first banding location (e.g., coordinate positions of the first banding location). Once at the first banding location, the banding mechanism 110 may acuate, such as moving arms to wrap around the first item and the second item, feeding banding material around the first item and the second item, sealing the banding material together, tensioning the banding material, and so forth.

At 1516, the process 1500 may include causing at least one of the platform of the banding mechanism to move. For example, the translation mechanism 1214 may rotate, translate, or otherwise move the platform 102 and/or the banding mechanism 110.

At 1518, the process 1500 may include causing, via the banding mechanism, the first item and the second item to be banded at the second banding location. For example, once the banding mechanism 110 has moved into position or otherwise to the second banding location (e.g., coordinate positions of the second banding location), the banding mechanism 110 may acuate, such as moving arms to wrap around the first item and the second item, feeding banding material around the first item and the second item, sealing the banding material together, tensioning the banding material, and so forth.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving first data indicating a first item being placed on a platform that includes a plurality of rods;
   determining, based at least in part on the first data, one or more first rods of the plurality of rods that at least partially receive the first item;
   causing the one or more first rods to be at least partially retracted on the platform;
   receiving second data indicating a second item being placed on the platform;
   determining, based at least in part on the second data, one or more second rods of the plurality of rods that at least partially receive the second item;
   determining a first banding location at which to place a first band around the first item and the second item; and
   causing the one or more second rods to be at least partially retracted on the platform.

2. The method of claim 1, further comprising:
   determining a second banding location at which to place a second band around the first item and the second item.

3. The method of claim 2, wherein at least one of the first banding location or the second banding location is based at least in part on at least one of:
   one or more first dimensions of the first item;
   one or more second dimensions of the second item;
   a first shape of the first item;
   a second shape of the second item;
   a first weight of the first item;
   a second weight of the second item;
   a first packaging of the first item; or
   a second packaging of the second item.

4. The method of claim 2, further comprising at least one of:
   causing the first band to be placed at the first banding location; or
   causing the second band to be placed at the second banding location.

5. The method of claim 2, wherein:
   the first band is oriented in a first direction; and
   the second band is oriented in a second direction that is different than the first direction.

6. The method of claim 1, wherein:
   individual rods of the plurality of rods are configured to transition between an extended state and a retracted state;
   causing the one or more first rods to be at least partially retracted on the platform includes causing the one or more first rods to transition from the extended state to the retracted state; and
   causing the one or more second rods to be at least partially retracted on the platform includes causing the one or more second rods to transition from the extended state to the retracted state.

7. The method of claim 1, wherein:
   determining the one or more first rods is based at least in part on at least one of:
      one or more first dimensions of the first item,
      a first shape of the first item, or
      a first weight of the first item; and
   determining the one or more second rods is based at least in part on at least one of:
      one or more second dimensions of the second item,
      a second shape of the second item, or
      a second weight of the second item.

8. The method of claim 1, further comprising at least one of:
   causing a first indication to be output on the platform associated with a first placement of the first item on the one or more first rods; or
   causing a second indication to be output on the platform associated with a second placement of the second item on the one or more second rods.

9. The method of claim 1, further comprising:
   determining that the first item and the second item have been removed from the platform; and
   causing the one or more first rods and the one or more second rods to be extended.

10. The method of claim 1, further comprising:
    receiving third data indicating a third item being placed on the platform; and
    determining, based at least in part on the third data, one or more third rods of the plurality of rods that at least partially receive the third item.

11. A method comprising:
receiving first data indicating a first item being placed on a bed of rods;
determining, based at least in part on the first data, one or more first rods of the bed of rods that at least partially receive the first item, the one or more first rods being at least partially retracted;
receiving second data indicating a second item being placed on the bed of rods;
determining, based at least in part on the second data, one or more second rods of the bed of rods that at least partially receive the second item, the one or more second rods being at least partially retracted;
determining one or more banding locations associated with placing one or more bands around the first item and the second item; and
receiving third data indicating a removal of the first item and the second item from the bed of rods.

12. The method of claim 11, further comprising:
determining, based at least in part on the one or more first rods, one or more first dimensions of the first item; and
determining, based at least in part on the one or more second rods, one or more second dimensions of the second item.

13. The method of claim 11, further comprising:
causing the one or more first rods to at least partially retract to retain the first item; and
causing the one or more second rods to at least partially retract to retain the second item.

14. The method of claim 11, further comprising at least one of:
causing the one or more bands to be placed around the first item and the second item; or
outputting one or more indications associated with the one or more bands to be placed around the first item and the second item.

15. The method of claim 11, wherein:
the one or more banding locations includes a first banding location and a second banding location;
the first banding location is associated with first coordinate positions on the bed of rods for placing a first band in a first direction around the first item and the second item; and
the second banding location is associated with second coordinate positions on the bed of rods for placing a second band in the first direction or a second direction around the first item and the second item.

16. A method comprising:
receiving first data indicating a first item being placed on a bed of rods;
determining, based at least in part on the first data, one or more first rods of the bed of rods that at least partially receive the first item, the one or more first rods being at least partially retracted;
receiving second data indicating a second item being placed on the bed of rods;
determining, based at least in part on the second data, one or more second rods of the bed of rods that at least partially receive the second item, the one or more second rods being at least partially retracted;
causing one or more bands to be placed around the first item and the second item; and
receiving third data indicating a removal of the first item and the second item from the bed of rods.

17. The method of claim 16, further comprising:
determining, based at least in part on the one or more first rods, one or more first dimensions of the first item; and
determining, based at least in part on the one or more second rods, one or more second dimensions of the second item.

18. The method of claim 16, further comprising:
causing the one or more first rods to at least partially retract to retain the first item; and
causing the one or more second rods to at least partially retract to retain the second item.

19. The method of claim 16, further comprising:
determining one or more banding locations associated with placing one or more bands around the first item and the second item.

20. The method of claim 16, further comprising at least one of:
causing the one or more bands to be placed around the first item and the second item; or
outputting one or more indications associated with the one or more bands to be placed around the first item and the second item.

* * * * *